United States Patent
Gibbs et al.

(10) Patent No.: US 12,302,197 B2
(45) Date of Patent: *May 13, 2025

(54) APPARATUSES, METHODS, AND COMPUTER PROGRAM PRODUCTS FOR CENTRALIZED CHANNEL MANAGEMENT IN A GROUP-BASED COMMUNICATION SYSTEM

(71) Applicant: Salesforce, Inc., San Francisco, CA (US)

(72) Inventors: Colin Gibbs, San Francisco, CA (US); Carmen Raffa, San Francisco, CA (US); Matthew Kump, Vancouver (CA); Aish Raj Dahal, San Francisco, CA (US); Jessica Rae Petersen, Oakland, CA (US); Ayushi Samaddar, Emeryville, CA (US); Robin McConnell Balaga, San Francisco, CA (US); Jessica Victoria Miller, Sunnyvale, CA (US)

(73) Assignee: Salesforce, Inc., San Francisco, CA (US)

( * ) Notice: Subject to any disclaimer, the term of this patent is extended or adjusted under 35 U.S.C. 154(b) by 116 days.

This patent is subject to a terminal disclaimer.

(21) Appl. No.: 18/200,568

(22) Filed: May 22, 2023

(65) Prior Publication Data

US 2023/0328486 A1    Oct. 12, 2023

Related U.S. Application Data

(63) Continuation of application No. 17/316,440, filed on May 10, 2021, now Pat. No. 11,689,895, which is a
(Continued)

(51) Int. Cl.
*H04W 4/08*    (2009.01)
*H04L 9/40*    (2022.01)
(Continued)

(52) U.S. Cl.
CPC .............. *H04W 4/08* (2013.01); *H04L 51/216* (2022.05); *H04L 63/104* (2013.01); *H04M 3/53* (2013.01); *H04W 4/12* (2013.01)

(58) Field of Classification Search
CPC . H04W 4/08; H04W 4/12; H04M 3/53; H04L 51/16; H04L 63/104
See application file for complete search history.

(56) References Cited

U.S. PATENT DOCUMENTS 9,253,130 B2    2/2016    Zaveri
9,985,998 B1    5/2018    Lewis et al.
(Continued)

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM).

(Continued)

*Primary Examiner* — Michael A Keller
(74) *Attorney, Agent, or Firm* — Lee & Hayes, P.C.

(57) ABSTRACT

Centralized channel management of a set group-based communication system is described. A channel management interface, of the group-based communication system, can be presented via a client of a user associated with a first organization, wherein the channel management interface includes communication channels associated with the first organization, wherein at least a first communication channel is associated with the first organization and a second organization, and wherein at least a second communication channel is associated with the first organization and a third organization. A request can be received via the channel management interface to initiate a channel management action associated with at least one of the first communication (Continued)

channel or the second communication channel and in response to receiving the request to initiate the channel management action, data associated with at least one of the first communication channel or the second communication channel can be updated.

20 Claims, 19 Drawing Sheets

Related U.S. Application Data continuation of application No. 16/779,513, filed on Jan. 31, 2020, now Pat. No. 11,089,445.

(51) Int. Cl.
  *H04L 51/216* (2022.01)
  *H04M 3/53* (2006.01)
  *H04W 4/12* (2009.01)

(56) References Cited

U.S. PATENT DOCUMENTS

| | | | |
|---|---|---|---|
| 10,708,216 | B1* | 7/2020 | Rao .................. H04L 51/52 |
| 2009/0287995 | A1 | 11/2009 | Tsao |
| 2013/0097253 | A1 | 4/2013 | Mencke |
| 2014/0040263 | A1 | 2/2014 | Sherman et al. |
| 2015/0143468 | A1 | 5/2015 | Hebert et al. |
| 2015/0163206 | A1 | 6/2015 | McCarthy et al. |
| 2016/0135042 | A1 | 5/2016 | Netto et al. |
| 2017/0041296 | A1 | 2/2017 | Ford et al. |
| 2018/0219806 | A1 | 8/2018 | Girishankar et al. |
| 2018/0287982 | A1 | 10/2018 | Draeger et al. |
| 2019/0347082 | A1 | 11/2019 | Gurtin et al. |
| 2020/0153765 | A1* | 5/2020 | Burbank .............. H04L 51/046 |
| 2020/0412708 | A1* | 12/2020 | Oberoi ................. H04L 63/029 |
| 2021/0243571 | A1 | 8/2021 | Gibbs et al. |
| 2021/0266709 | A1 | 8/2021 | Gibbs et al. |

OTHER PUBLICATIONS

Michael Carey, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims To Cut US All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield On How Slack Became A $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;26 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/ slack-customer-experience/, (Nov. 2018) 16 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, WIKIPEDIA, [online][retrieved May 30, 2019]. Retrieved from the Internet: <URL: https://en.wikipedia.org/wiki/Internet_Relay_Chat>. (dated May 28, 2019) 21 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", FUJITSU Sci. Tech. J., 36, 2, (Dec. 2000), pp. 154-161.
Office Action for U.S. Appl. No. 16/779,513, mailed on Jan. 26, 2021, Gibbs, "Apparatuses, Methods, And Computer Program Products For Centralized Channel Management In A Group-Based Communication System", 11 pages.
Office Action for U.S. Appl. No. 16/779,513, mailed on Oct. 29, 2020, Gibbs, "Apparatuses, Methods, And Computer Program Products For Centralized Channel Management In A Group-Based Communication System", 9 pages.
Office Action for U.S. Appl. No. 17/316,440, mailed on Oct. 6, 2022, Gibbs, "Apparatuses, Methods, And Computer Program Products For Centralized Channel Management In A Group-Based Communication System", 7 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking Up The Slack", TEDIUM, [online][retrieved May 9, 2019]. Retrieved from the Internet: <URL: https://tedium.co/2017/10/17/irc-vs-slack-chat-history/>. (dated Oct. 17, 2017) 13 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 5 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

APPARATUSES, METHODS, AND COMPUTER PROGRAM PRODUCTS FOR CENTRALIZED CHANNEL MANAGEMENT IN A GROUP-BASED COMMUNICATION SYSTEM

PRIORITY

This application is a continuation of, and claims priority to U.S. patent application Ser. No. 17/316,440, filed on May 10, 2021, entitled "Apparatuses, Methods, and Computer Program Products for Centralized Channel Management in a Group-Based Communication System", which is a continuation of U.S. patent application Ser. No. 16/779,513, filed on Jan. 31, 2020, entitled "Apparatuses, Methods, and Computer Program Products for Centralized Channel Management in a Group-Based Communication System", each of which is fully incorporated by reference herein.

TECHNOLOGICAL FIELD

Embodiments of the present disclosure generally relate to application programming interface functionality and interfaces for data object configuration, and specifically to improved functionality and interfaces for management of any number of group-based communication channels in a group-based communication system.

BACKGROUND

In a group-based environment, channels provide unique data objects structured to enable separation of users, conversations, topics, and/or the like. However, as a group-based environment begins to grow in complexity, for example over time as an increasing number of channels, workspaces, or other data objects are created and/or otherwise maintained, the task of efficiently managing the channels also increases in complexity. As the number of channels and/or complexity of channel management configurations increases, individual management of each channel can become impractical or inefficient. Various accounts may be configured to access channels with various permissions (e.g., as members, guest members, or the like), and if permissions for account access are left unchecked, data security and/or data privacy vulnerabilities, and/or other data management vulnerabilities, may become present as permissions for various user accounts are not properly maintained. Such risks are exacerbated in circumstances where sufficient procedural tools (e.g., application program interfaces or "APIs") and/or corresponding user interfaces are not provided for management of channel data and/or permissions, and/or for configuring permissions for management of channels by one or more user accounts. Further, without sufficient data attribution with respect to channel management permissions, data exposure with respect to one or more channels may be confusing to any number of users or may increase the likelihood of violations of data privacy legislation, policies, and/or business obligations/promises. Applicant has discovered problems with current implementations, such as systems, methods, apparatuses, and computer program products, for channel management in a group-based environment, for example via a group-based communication system, and through applied effort, ingenuity, and innovation, Applicant has solved many of these identified problems by developing embodied in the present disclosure, which are described in detail below.

BRIEF SUMMARY

In general, embodiments of the present disclosure provided herein include systems, methods, apparatuses and computer program products for centralized channel management via a group-based communication system. Other systems, apparatuses, methods, computer readable media, and features will be, or will become, apparent to one with skill in the art upon examination of the following figures and detailed description. It is intended that all such additional systems, apparatuses, methods, computer readable media, and features be included within this description be within the scope of the disclosure, and be protected by the following claims.

In accordance with at least one aspect of the present disclosure, a computer-implemented method is provided. The computer-implemented method may be performed using any of a myriad of implementations embodied in hardware, software, firmware, and/or a combination thereof, as described herein. In at least one example, the computer-implemented method includes receiving centralized channel data including a group-based communication channel metadata set for each group-based communication channel in a manageable group-based communication channel set for an authenticated user account. The computer-implemented method further includes in response to receiving the centralized channel data, causing rendering of a centralized channel management dashboard based at least on the centralized channel data, the centralized channel management dashboard comprising the group-based communication channel metadata set for each group-based communication channel in the manageable group-based communication channel set, where the centralized channel management dashboard further comprises at least one channel management action interface element associated with at least one group-based communication channel in the manageable group-based communication channel set.

In some embodiments of the example computer-implemented method, the authenticated user account is associated with workspace management permission data linked to a workspace identifier, and the manageable group-based communication channel set comprises at least one group-based communication channel associated with the workspace identifier. Additionally or alternatively, in some embodiments of the example computer-implemented method, the authenticated user account is associated with organization management permission data linked to an organization identifier, and the manageable group-based communication channel set comprises at least one group-based communication channel associated with the organization identifier.

In some embodiments of the example computer-implemented method, the computer-implemented method further includes transmitting a centralized channel management request to a group-based communication system, the centralized channel management request associated with an authenticated user account identifier corresponding to the authenticated user account.

In some embodiments of the example computer-implemented method, the computer-implemented method further includes transmitting, to the group-based communication system, channel management data associated with a selected group-based communication channel of the manageable group-based communication channel set in response to user interaction with the at least one channel management action interface element.

Additionally or alternatively, in some embodiments of the example computer-implemented method, the manageable group-based communication channel set comprises at least a private group-based communication channel, and the authenticated user account is identified by channel owner data for the private group-based communication channel or delegated management data for the private group-based communication channel.

Additionally or alternatively, in some embodiments of the example computer-implemented method, the group-based communication channel metadata set comprises one or more of channel private status data, channel archive status data, channel workspace data, channel organization-sharing status data, authenticated account member data, guest account member data, channel creation timestamp data, channel creator account data, historical activity data, channel share status data, or channel guest status data.

Additionally or alternatively, in some embodiments of the example computer-implemented method, the at least one channel management action interface element is associated with one or more of a channel posting rule action, a user access action, a channel defaulting action, a channel archive action, a channel rename action, a channel share action, or a channel delete action.

Additionally or alternatively, in some embodiments of the example computer-implemented method, the manageable group-based communication channel set comprises at least one inaccessible group-based communication channel for the authenticated user account.

In accordance with yet another aspect of the present disclosure, an apparatus for centralized channel management within a group-based communication system is provided. In at least one example embodiment, the apparatus includes at least one non-transitory memory and at least one processor. The at least one non-transitory memory includes computer-coded instructions stored thereon. The computer-coded instructions, in execution with the at least one processor, configure the apparatus to perform any one of the example computer-implemented methods described above, and/or any combination thereof. In another example embodiment, the apparatus includes means for performing each step of any one of the example computer-implemented methods described above, and/or any combination thereof.

In accordance with yet another aspect of the present disclosure, a computer program product centralized channel management within a group-based communication system is provided. The computer program product includes at least one non-transitory computer-readable storage medium having computer program code stored thereon. The computer program code is configured, in execution with at least one processor, for performing any of the example computer-implemented methods described above, and/or any combination thereof.

In accordance with yet another aspect of the present disclosure, a second computer-implemented method is provided. The second computer-implemented method may be performed using any of a myriad of implementations embodied in hardware, software, firmware, and/or a combination thereof, as described herein. In at least one example, the second computer-implemented method includes receiving, from a client device, a centralized channel management request, the centralized channel management request associated with an authenticated user account identifier. The second example computer-implemented method further includes identifying a group-based communication channel metadata set for each group-based communication channel in a manageable group-based communication channel set permissioned for management by an authenticated user account associated with the authenticated user account identifier. The second example computer-implemented method further includes transmitting, to the client device, the group-based communication channel metadata set to cause rendering of a centralized channel management dashboard based on at least the group-based communication channel metadata set, the centralized channel management dashboard comprising the group-based communication channel metadata set for each group-based communication channel in the manageable group-based communication channel set, where the centralized channel management dashboard further comprises at least one channel management action interface element associated with at least one group-based communication channel in the manageable group-based communication channel set.

In some embodiments of the second example computer-implemented method, identifying the group-based communication channel metadata set comprises identifying a group-based communication channel identifier set associated with the manageable group-based communication channel set; and querying a channel datastore based on the group-based communication channel identifier set to receive, in response to the query, each group-based communication channel metadata set associated with each group-based communication channel identifier in the group-based communication channel identifier set.

In some embodiments of the second example computer-implemented method, the second computer-implemented method further includes determining the authenticated user account identifier is associated with workspace permission data linked to a workspace identifier, and identifying the group-based communication channel metadata set for each group-based communication channel in the manageable group-based communication channel set comprises: identifying each group-based communication channel metadata set for at least one group-based communication channel associated with the workspace identifier.

In some embodiments of the second example computer-implemented method, the second computer-implemented method further includes determining the authenticated user account identifier is associated with organization permission data linked to an organization identifier, and identifying the group-based communication channel metadata set for each group-based communication channel in the manageable group-based communication channel set comprises: identifying each group-based communication channel metadata set for at least one group-based communication channel associated with the organization identifier.

In some embodiments of the second example computer-implemented method, identifying the group-based communication channel metadata set for each group-based communication channel in the manageable group-based communication channel set comprises: determining the authenticated user account identifier is associated with channel owner data or delegated management data for a private group-based communication channel, a public group-based communication channel, or a common group-based communication channel; and identifying at least a group-based communication channel metadata set for the private group-based communication channel.

In some embodiments of the second example computer-implemented method, the second computer-implemented method further includes receiving, from a second client device associated with a second authenticated user account, a selected channel information request for a selected group-based communication channel of the manageable group-based communication channel set; identifying, based on the group-based communication channel metadata set associated with the selected group-based communication channel, channel privacy access data associated with the selected group-based communication channel; and transmitting, to the second client device, the channel privacy access data to cause rendering of channel privacy notification information, based on the channel privacy access data, associated with the selected group-based communication channel.

In some embodiments of the second example computer-implemented method, the second computer-implemented method further includes the manageable group-based communication channel set comprises at least one inaccessible group-based communication channel for the authenticated user account.

In some embodiments of the second example computer-implemented method, the second computer-implemented method further includes receiving, from the client device, channel management data associated with a selected group-based communication channel of the manageable group-based communication channel set in response to user interaction with the centralized channel management dashboard; and processing the channel management data to update the selected group-based communication channel.

In accordance with yet another aspect of the present disclosure, a second example apparatus for centralized channel management within a group-based communication system is provided. In at least one example embodiment, the second example apparatus includes at least one non-transitory memory and at least one processor. The at least one non-transitory memory includes computer-coded instructions stored thereon. The computer-coded instructions, in execution with the at least one processor, configure the second example apparatus to perform any one of the second example computer-implemented methods described above, and/or any combination thereof. In another example embodiment, the apparatus includes means for performing each step of any one of the second example computer-implemented methods described above, and/or any combination thereof.

In accordance with yet another aspect of the present disclosure, a second example computer program product centralized channel management within a group-based communication system is provided. The second example computer program product includes at least one non-transitory computer-readable storage medium having computer program code stored thereon. The computer program code is configured, in execution with at least one processor, for performing any of the second example computer-implemented methods described above, and/or any combination thereof.

BRIEF DESCRIPTION OF THE DRAWINGS

Figure 1:
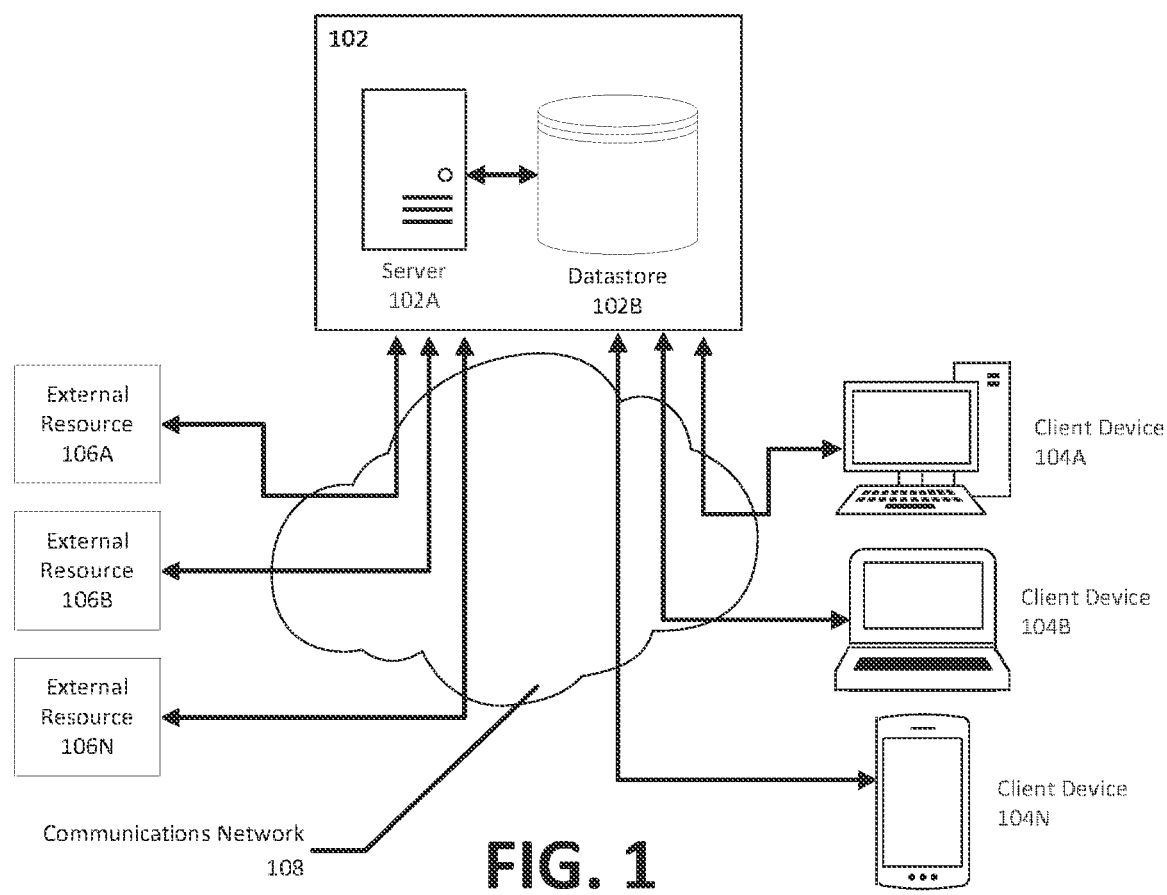
Figure 2:
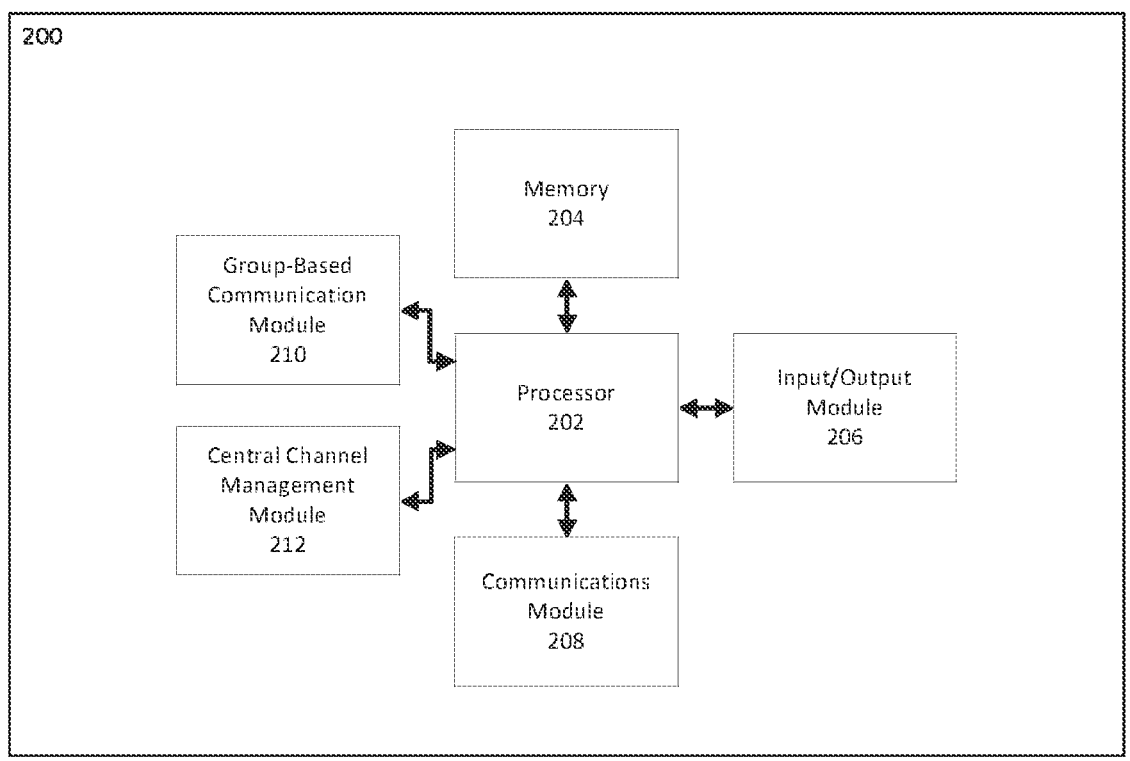
Figure 3:
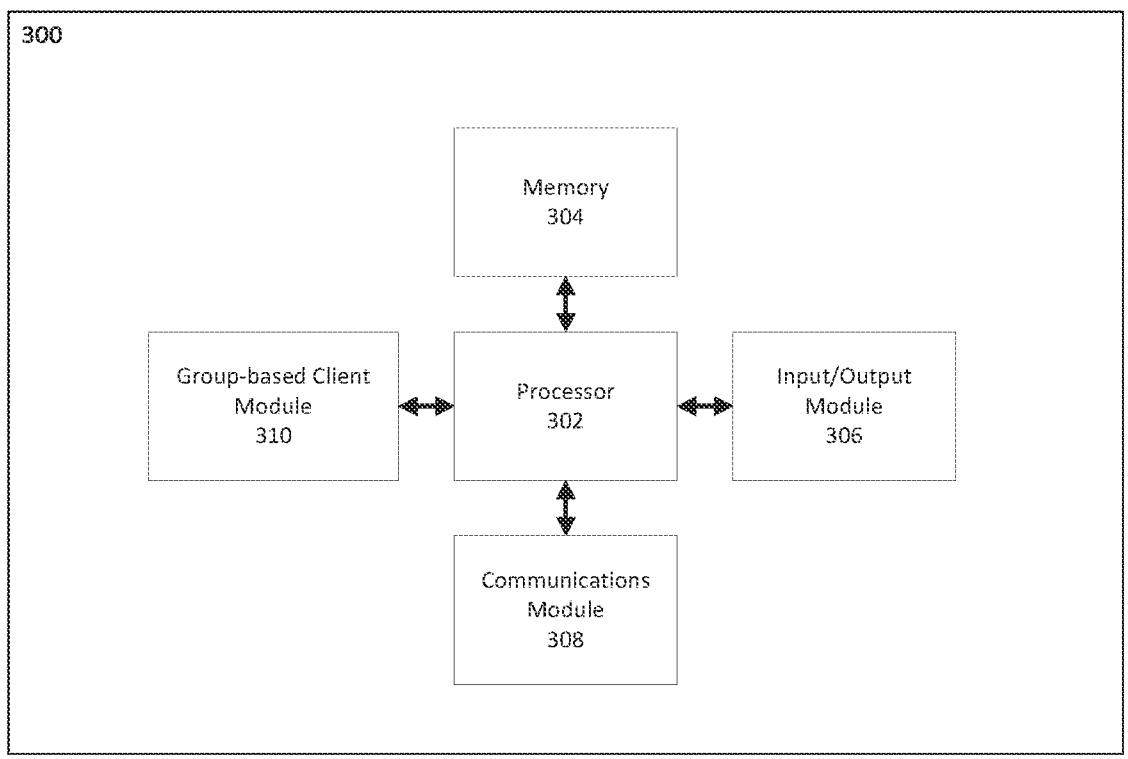
Figure 4A:
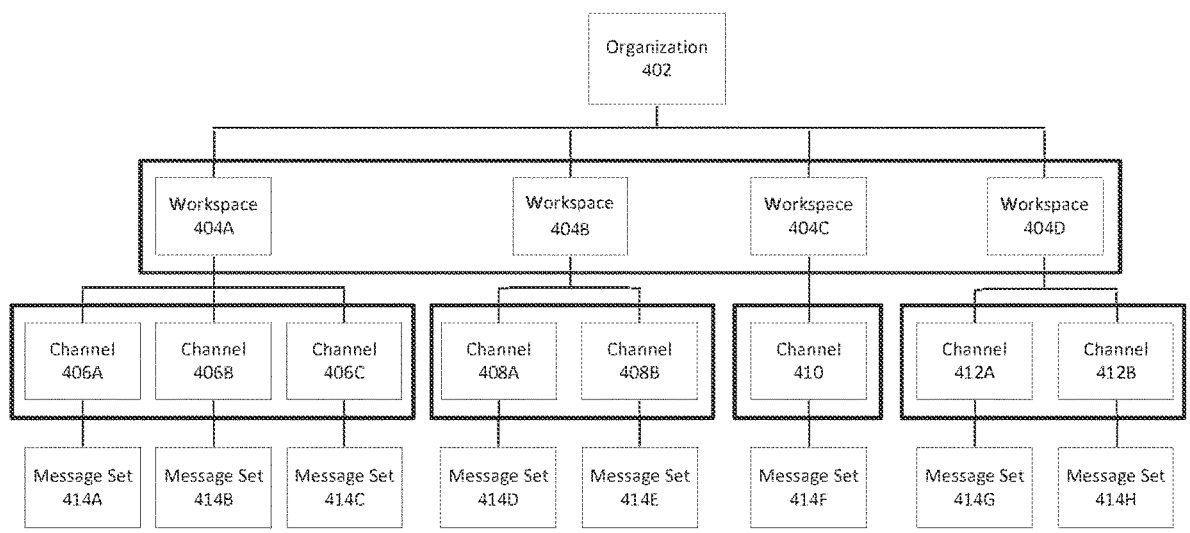
Figure 4B:
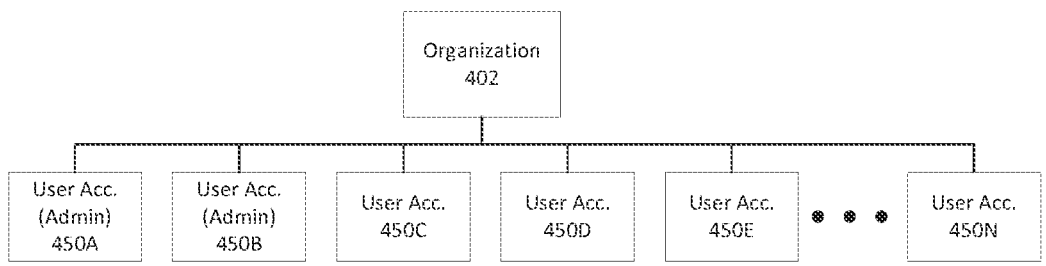
Figure 5A:
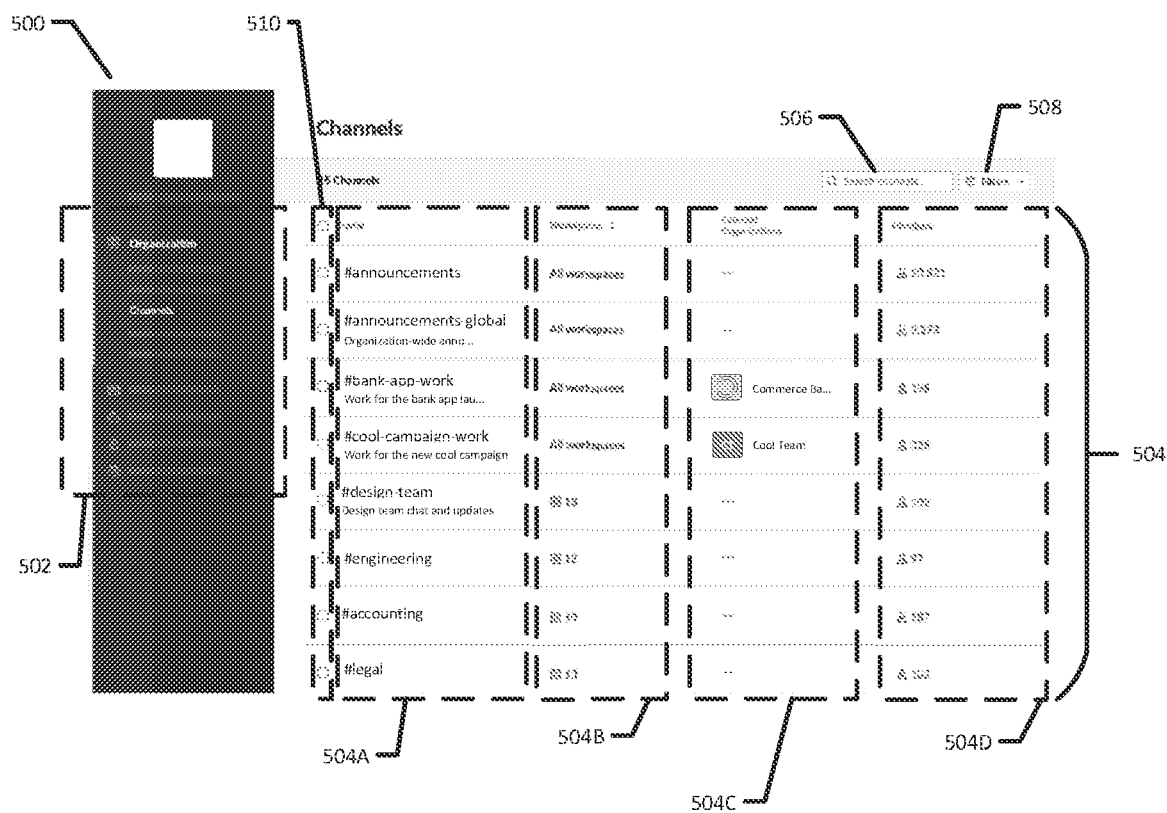
Figure 5B:
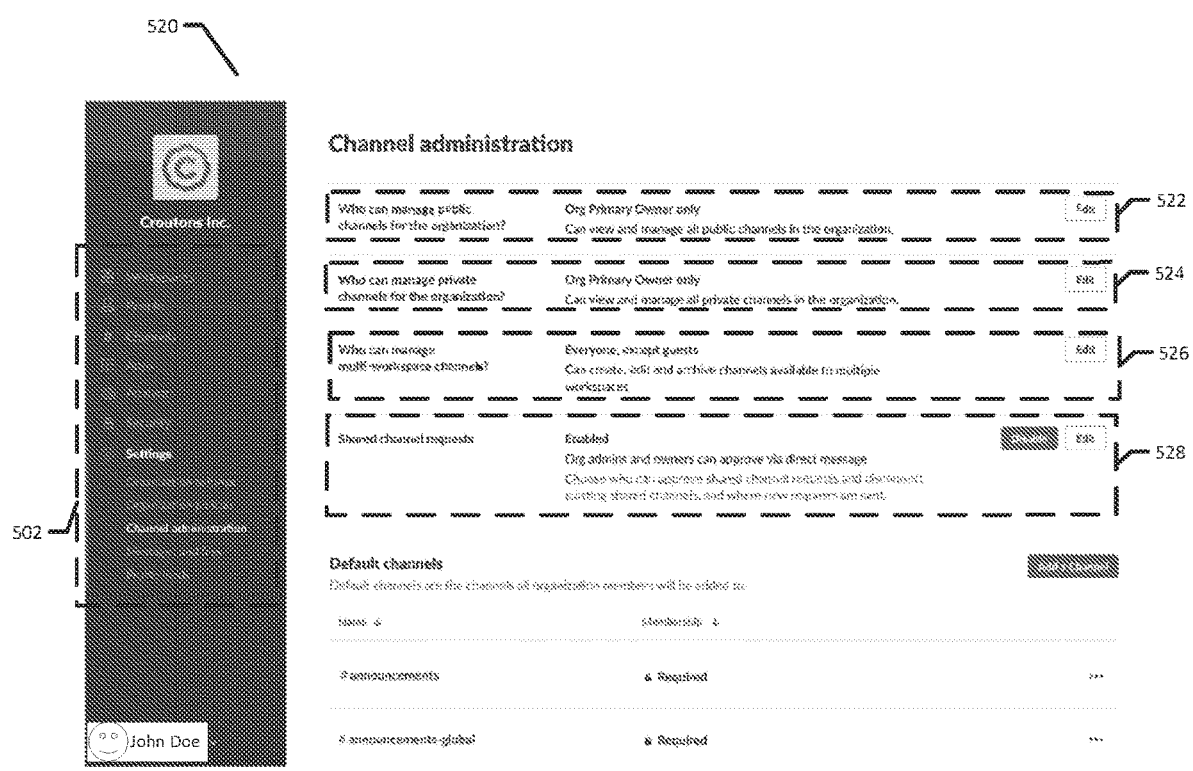
Figure 5C:
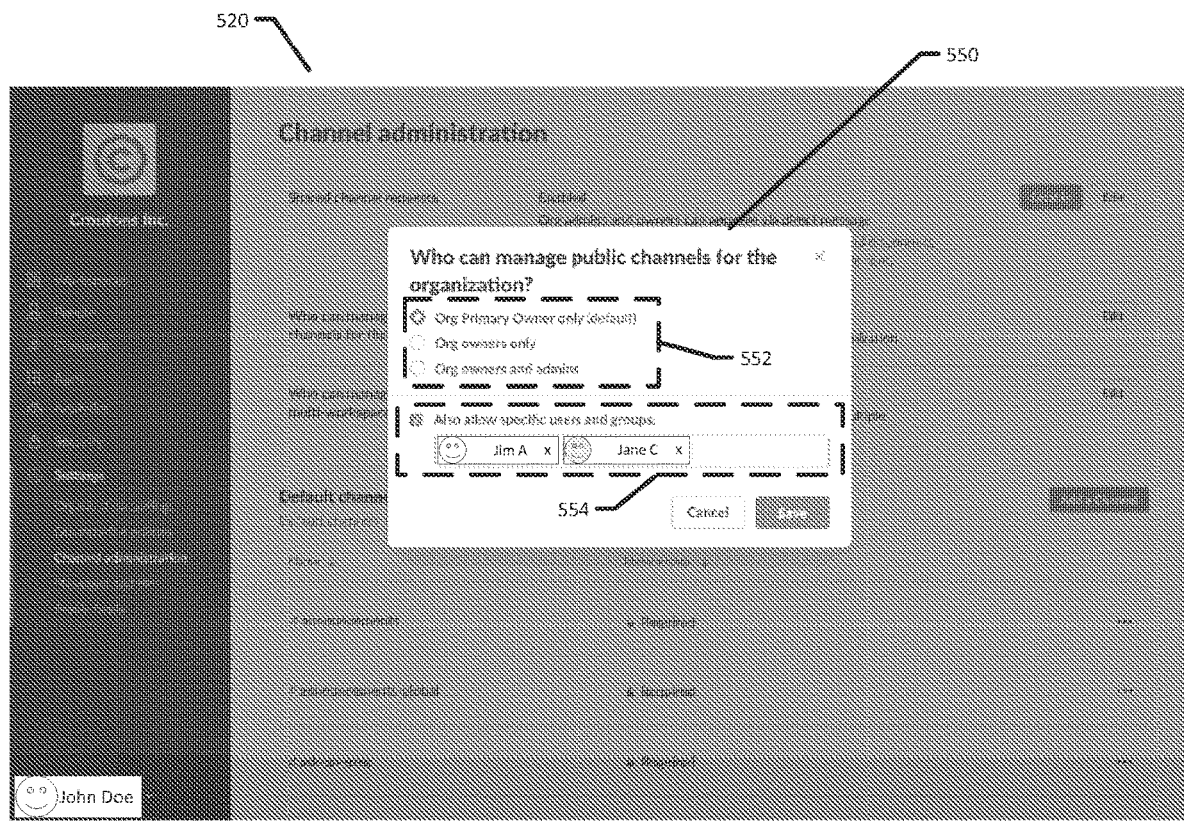
Figure 6A:
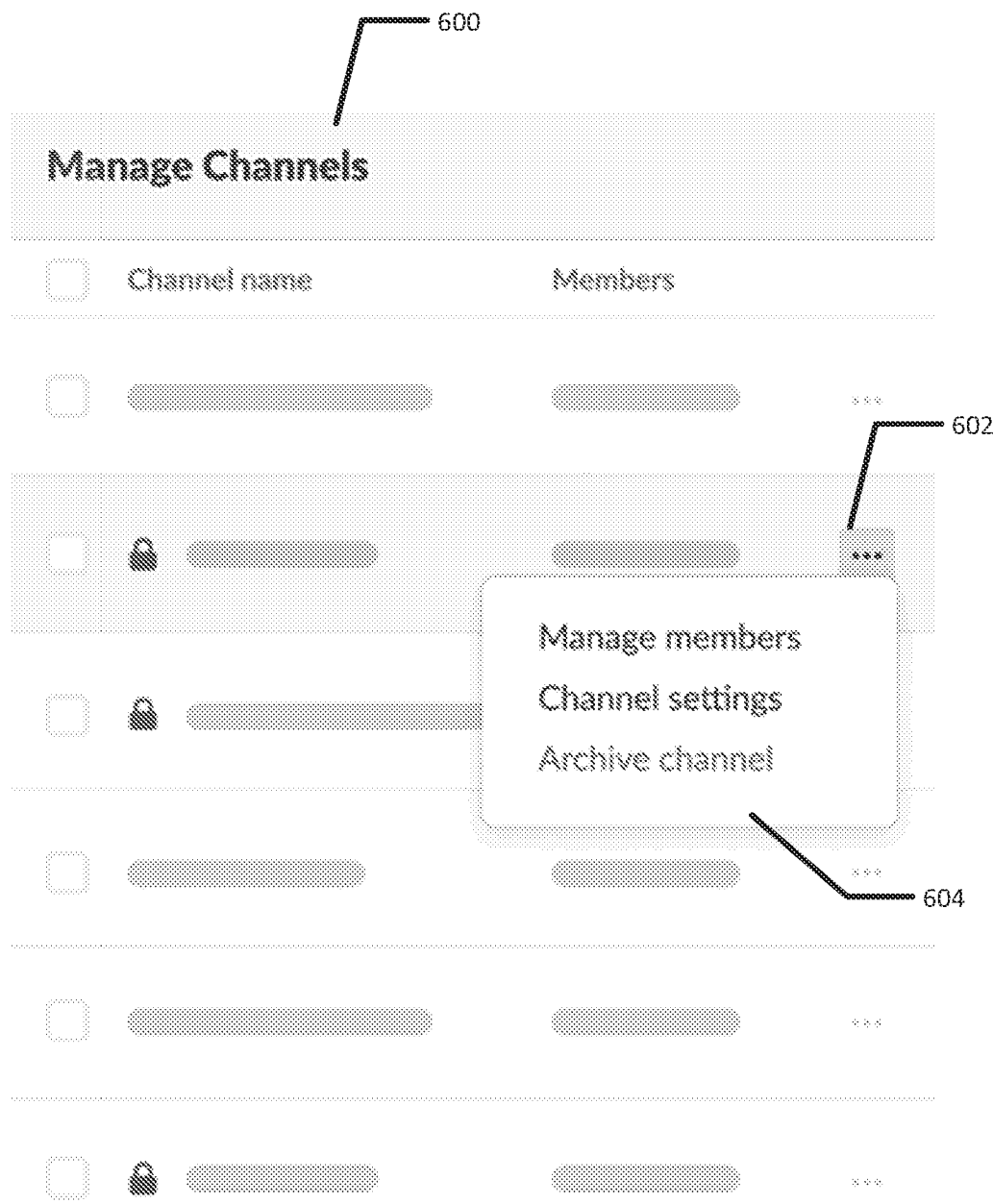
Figure 6B:
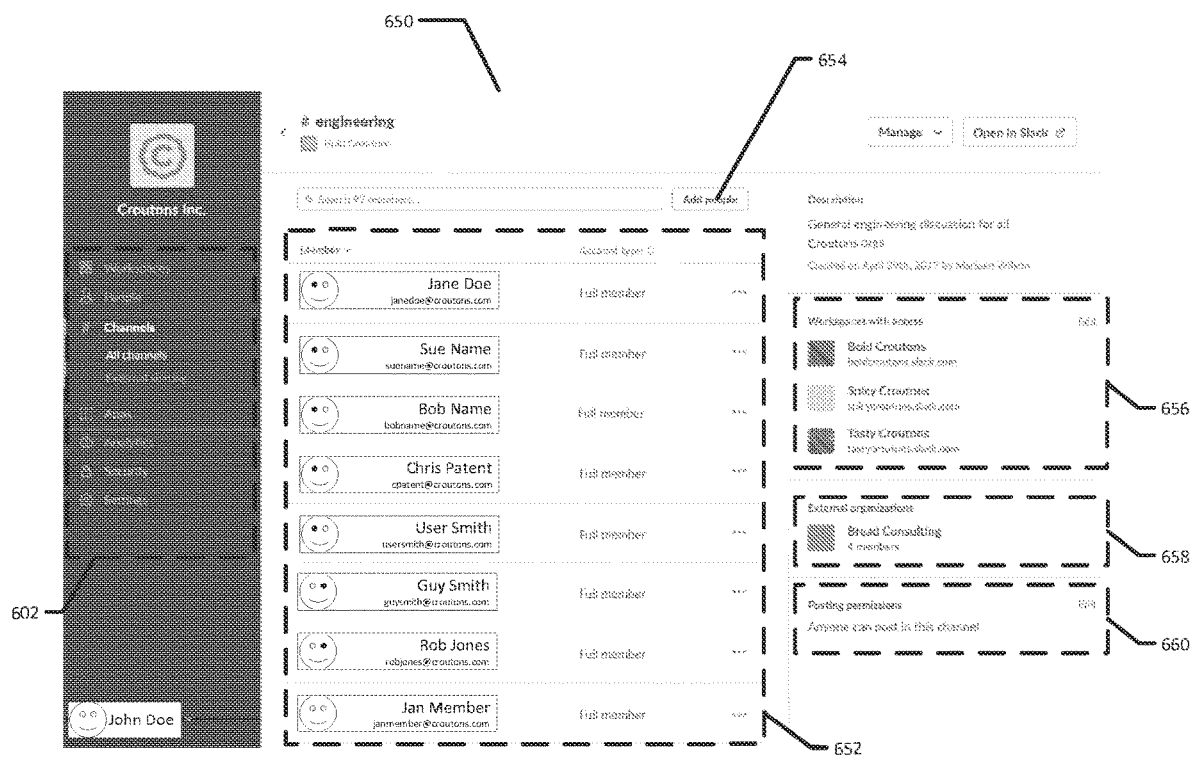
Figure 7:
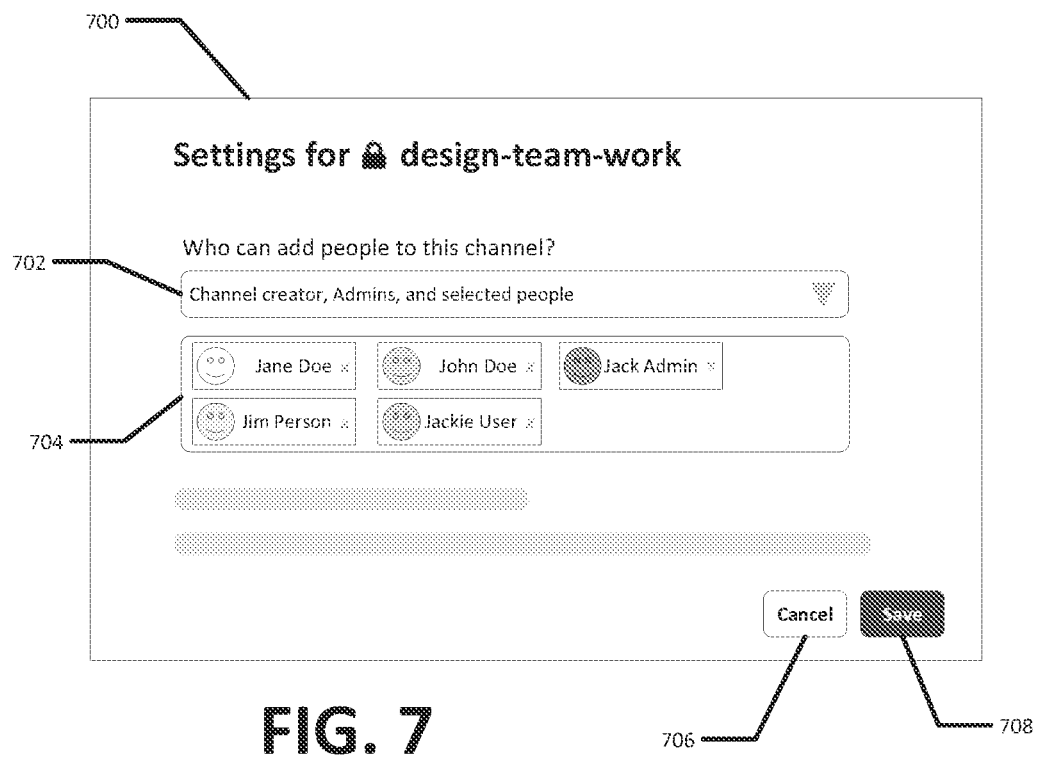
Figure 8:
Figure 9:
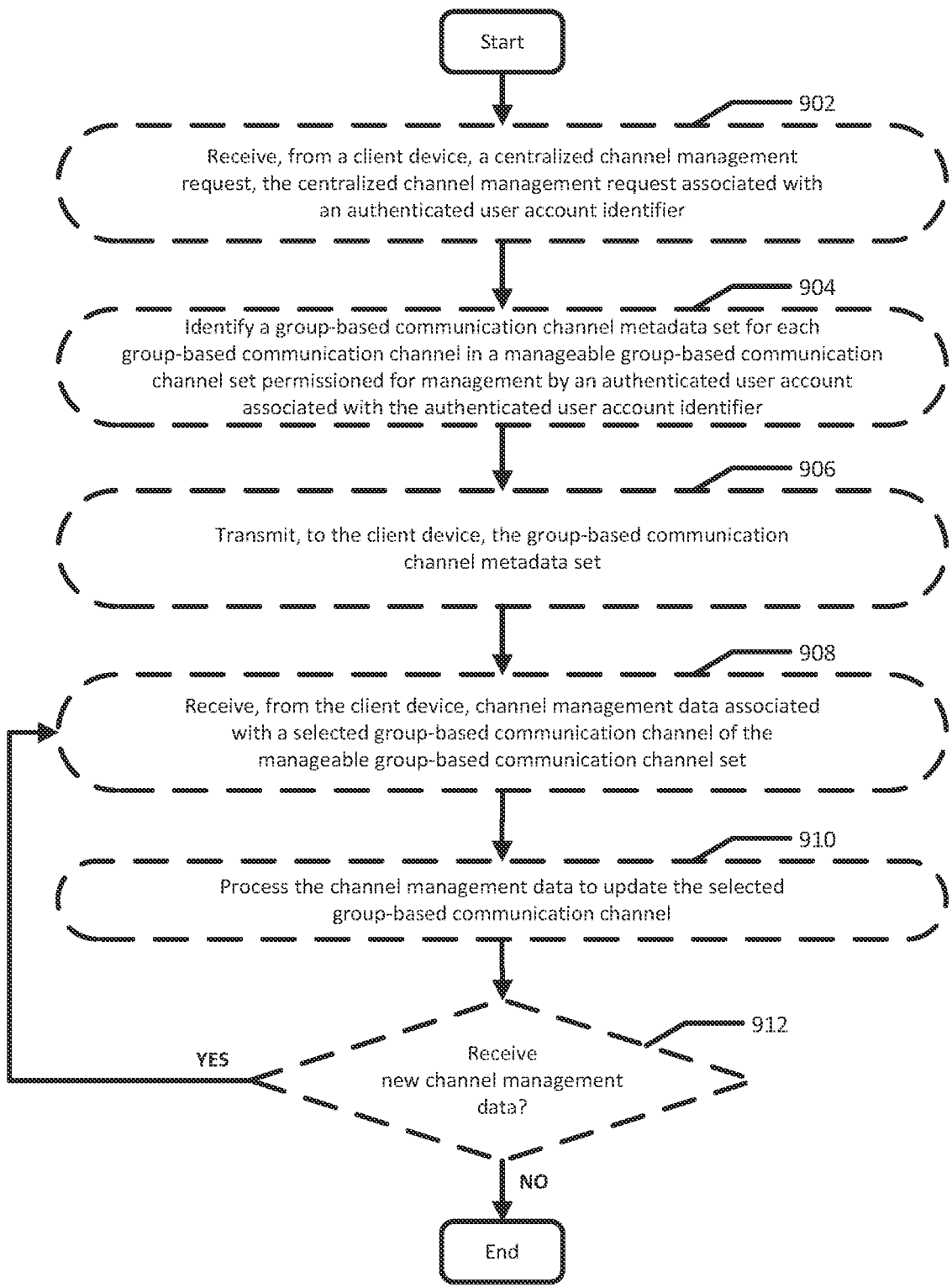
Figure 10:
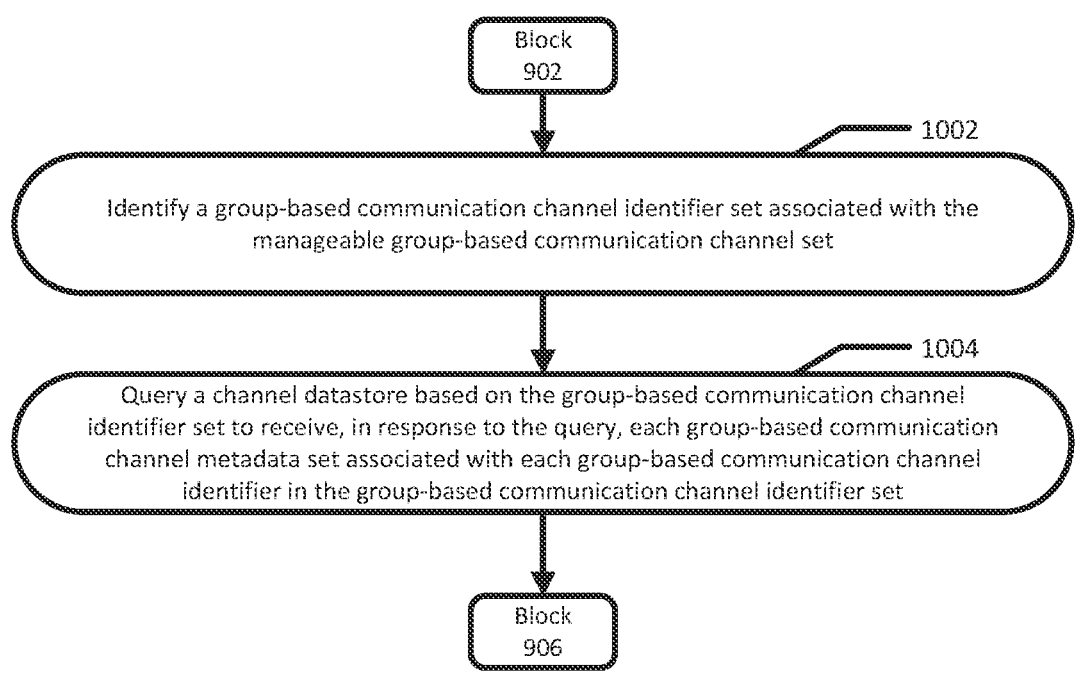
Figure 11:
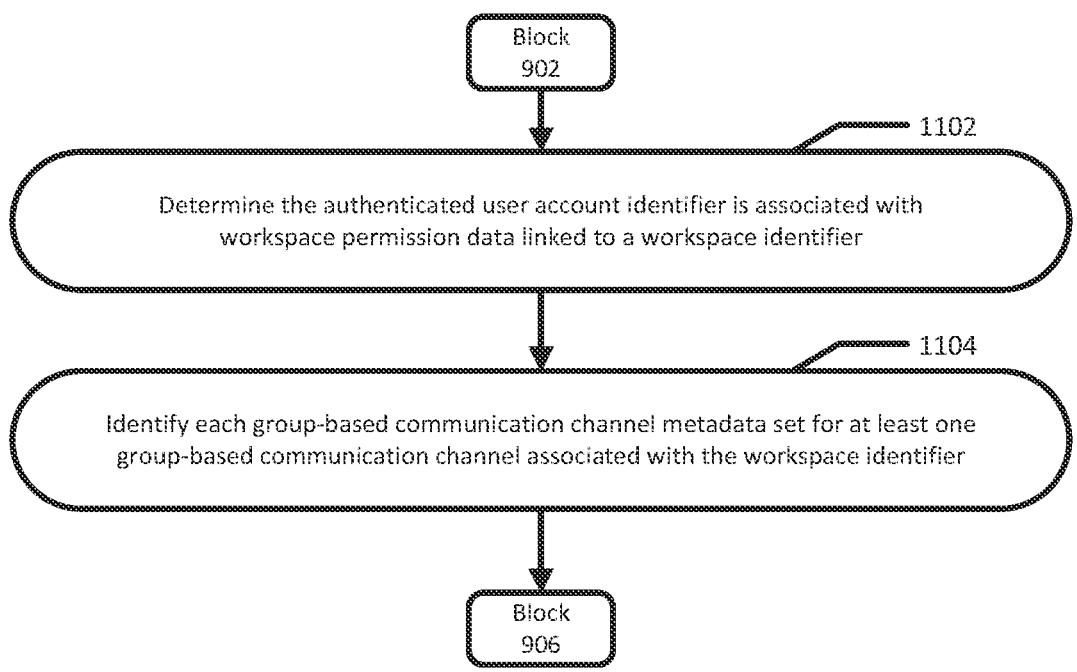
Figure 12:
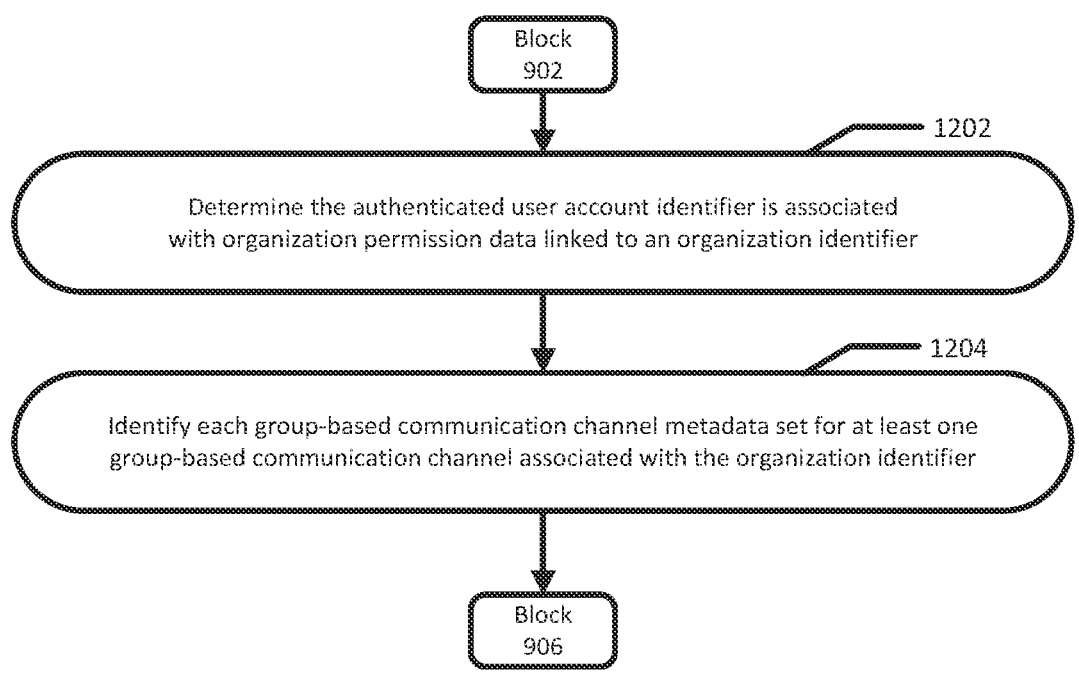
Figure 13:
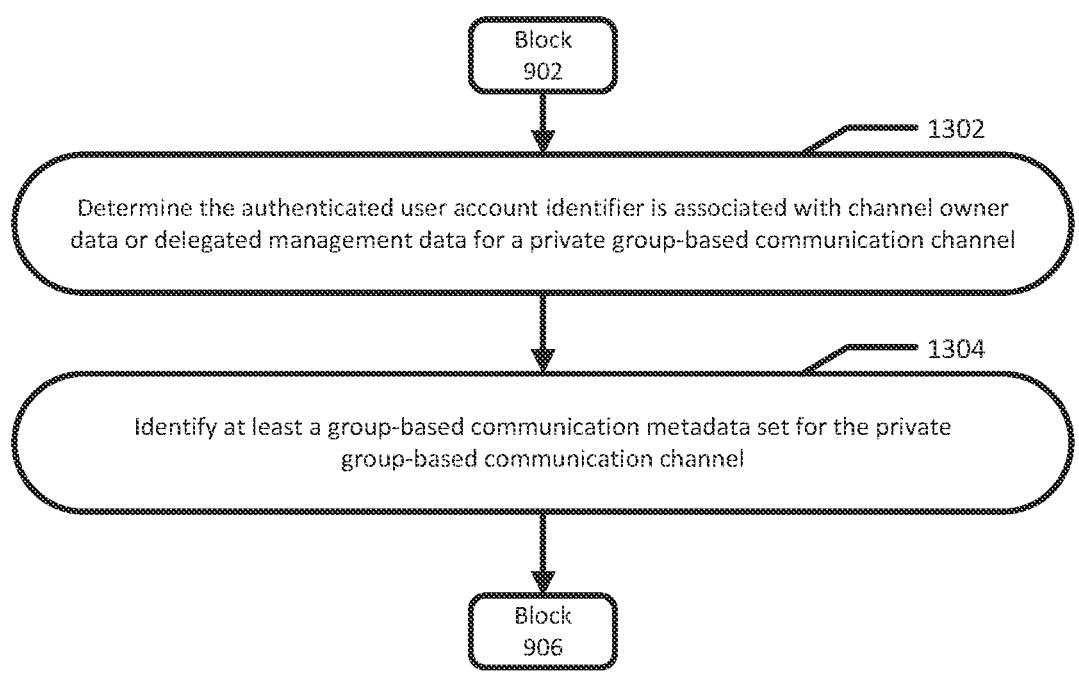
Figure 14:
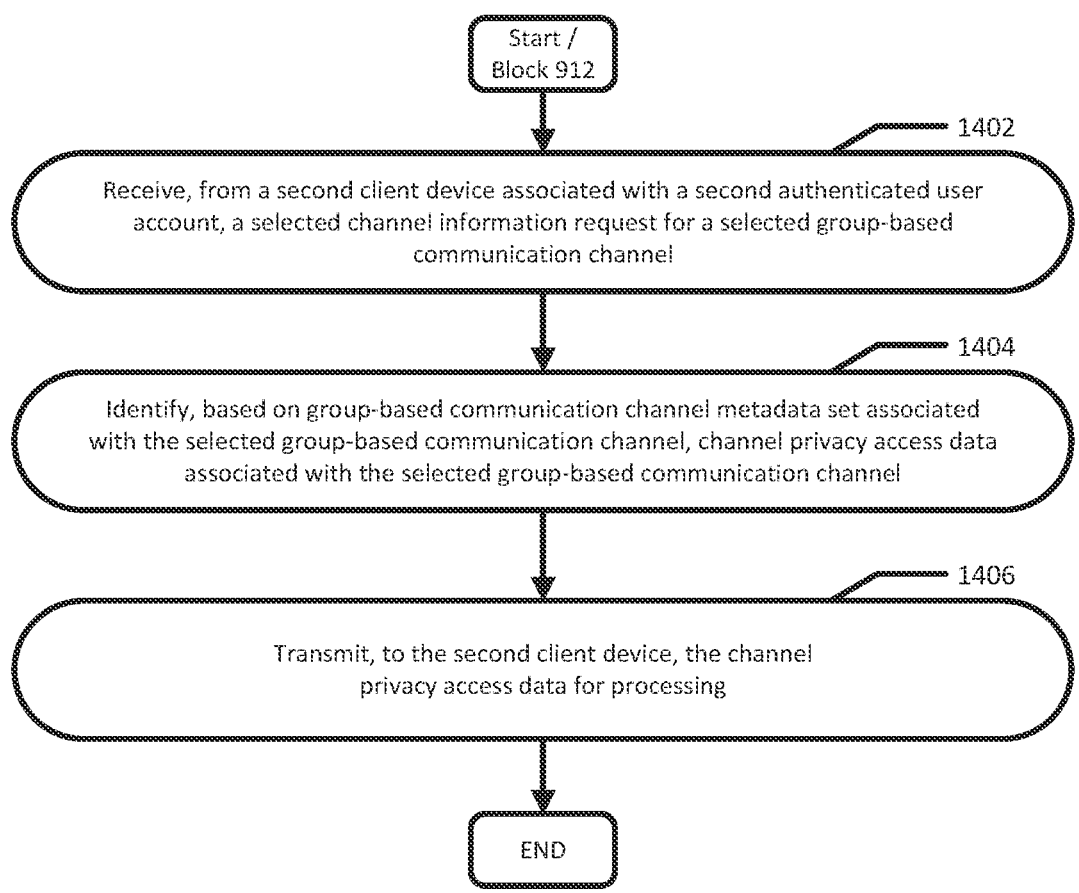
Figure 15:
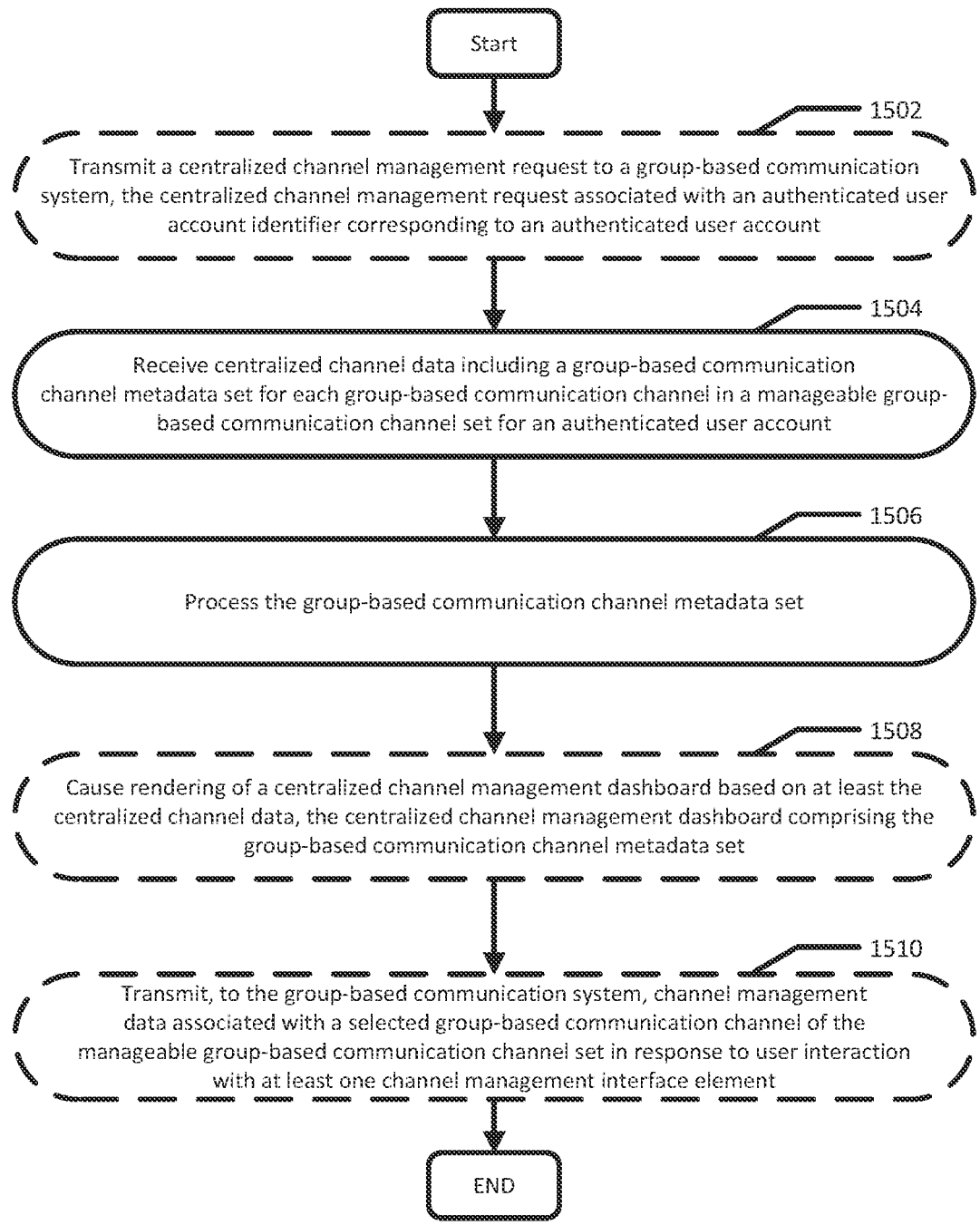

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2 illustrates a block diagram of an example apparatus that may be specially configured in accordance with at least one example embodiment of the present disclosure;

FIG. 3 illustrates a block diagram of another example apparatus that may be specially configured in accordance with at least one example embodiment of the present disclosure;

FIG. 4A illustrates an example computing environment representing aspects of a group-based communication system, in accordance with at least one example embodiment of the present disclosure;

FIG. 4B illustrates an example computing environment representing other aspects of a group-based communication system, in accordance with at least one example embodiment of the present disclosure;

FIG. 5A illustrates an example user interface including various information and enabling various functionality for centralized channel management, in accordance with at least one example embodiment of the present disclosure;

FIG. 5B illustrates an example dashboard sub-interface for altering permission data associated with organization-level channel management in accordance with at least some example embodiments of the present disclosure;

FIG. 5C illustrates an example interface for editing permission data associated with group-based communication channel management, in accordance with at least some embodiments of the present disclosure;

FIG. 6A illustrates including various information and enabling various functionality for centralized channel management, in accordance with at least one example embodiment of the present disclosure;

FIG. 6B illustrates another example user interface including various information and enabling various functionality for centralized channel management, in accordance with at least one example embodiment of the present disclosure;

FIG. 7 illustrates another example user interface including various information and enabling various functionality for centralized channel management, in accordance with at least one example embodiment of the present disclosure;

FIG. 8 illustrates another example user interface including various information and enabling various functionality for centralized channel management, in accordance with at least one example embodiment of the present disclosure;

FIG. 9 illustrates a flowchart depicting example operations for an example process for centralized channel management, in accordance with at least some example embodiments of the present disclosure;

FIG. 10 illustrates a flowchart depicting example additional operations for an example process for centralized channel management, specifically to identify a group-based communication metadata set for one or more group-based communication channel, in accordance with at least some example embodiments of the present disclosure;

FIG. 11 illustrates a flowchart depicting example additional operations for an example process for centralized channel management, specifically to identify a group-based communication metadata set for one or more group-based communication channel, in accordance with at least some example embodiments of the present disclosure;

FIG. 12 illustrates a flowchart depicting example additional operations for an example process for centralized channel management, specifically to identify a group-based communication metadata set for one or more group-based communication channel, in accordance with at least some example embodiments of the present disclosure;

FIG. 13 illustrates a flowchart depicting example additional operations for an example process for centralized channel management, specifically to identify a group-based communication metadata set for one or more group-based communication channel, in accordance with at least some example embodiments of the present disclosure;

FIG. 14 further illustrates a flowchart depicting example additional operations for an example process for centralized channel management, specifically to provide channel privacy access data associated with a selected group-based communication channel, in accordance with at least some example embodiments of the present disclosure; and FIG. 15 illustrates a flowchart depicting various example operations for processes and/or sub-processes for centralized channel management, in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Entities maintained as data objects in a group-based communication system may be represented in any of a myriad of manners, with various entities being associated with one another directly and/or indirectly. For example, in at least one example context, a group-based communication system may be configured to manage any number of organizations, each organization associated with any number of group-based workspaces, and each workspace further associated with any number of group-based communication channels. Similarly, each of these entities may be associated with any number of authenticated user accounts. For example, an organization may include any number of authenticated user accounts indicated as members of the organization. Similarly, each group-based workspace may be configured for access with any number of authenticated user accounts as members of the group-based workspace, such as where the authenticated user account(s) is/are permissioned to access all or a portion of the group-based workspace. Further still, each group-based communication channel may be configured as accessible by a desired subset of members within the associated group-based workspace.

In this regard, any number of group-based communication channels may be managed by one or more user accounts to configure the group-based communication channel for managing access permissions, data storage, and/or other settings as desired. In at least one example context, channel management may include viewing information associated with group-based communication channels, changing one or more settings values for one or more group-based communication channels (e.g., to configure the one or more group-based communication channels as a common group-based communication channel shared with one or more other organizations, or to remove such sharing permissions), granting permission data to one or more user accounts for accessing one or more group-based communication channels, and/or removing permission data associated with one or more authenticated user accounts to remove access to one or more group-based communication channels. Various administrator user accounts may be permissioned for managing one or more group-based communication channels.

In at least some example contexts, the group-based communication system manages various entities based on an entity hierarchy. In this regard, permission data for managing one or more group-based communication channels may be based at least in part on the entity hierarchy For example, an authenticated user account may be associated with permission data specifically configured for managing a particular group-based communication channel. Additionally or alternatively, an authenticated user account may be associated with permission data for managing a workspace, and in this regard the authenticated user account may be permissioned for managing all group-based communication channels within the group-based workspace or a specific subset of group-based communication channels within the group-based workspace. Additionally or alternatively yet, an authenticated user account may be associated with permission data for managing an organization, and in this regard the authenticated user account may be permissioned for managing all group-based communication channels within any group-based workspaces associated with the organization. In some such circumstances, the number of group-based communication channels manageable by an authenticated user account is significant, such that efficient channel management systems are required to make such management practical and/or otherwise possible.

Implementations of group-based communication systems often lack the ability to access desired information associated with group-based communication channels that a particular user may manage. Often, to access information associated with a group-based communication channel and/or manage the group-based communication channel, the user must first join the group-based communication channel to access, and/or update, settings and/or other information for the group-based communication channel. In traditional implementations, additional complexity is further introduced in circumstances where a user desires to manage a group-based communication channel not readily accessible via the user's authenticated user account. For example, in conventional implementations, a user desiring to manage a private group-based communication channel, the user often must be invited and/or request an invite to join the private group-based communication channel, and only after successfully joining (e.g., and being configured to access the private group-based communication channel) can the user access the desired information and/or update data to manage the group-based communication channel. In circumstances where an authenticated user account is only temporarily joining the group-based communication channel (e.g., to manage the group-based communication channel), processing resources dedicated to the process of joining the group-based communication channel are entirely wasted. Further, such a process for channel management increases user frustration for administrators and other users involved with the process.

Embodiments herein provide apparatuses, systems, computer-implemented methods, and computer program products for centralized channel management via a group-based communication system. Some such embodiments provide for improved functionality for accessing and/or displaying channel information for any number of group-based communication channels, for example to further enable streamlined processing and/or analysis via a client device, for example by a user accessing the client device. Additionally or alternatively, embodiments herein provide functionality for managing any number of group-based communication channels, for example to manage a plurality group-based communication channels with reduced operations with respect to managing such group-based communication channels individually. Additionally or alternatively still, some such embodiments provide functionality for configuring and/or causing rendering of one or more associated improved user interfaces enabling centralized channel management of any number of group-based communication channels to reduce the number of user interactions required for managing any number of the group-based communication channels. Further, by providing functionality for centralized channel management, processing resources may be conserved by not requiring a user join and/or access a group-based communication channel to manage said group-based communication channel. In this regard, an authenticated user account may manage the group-based communication channel even in circumstances where the authenticated user account is not associated with permission data for accessing the group-based communication channel, reducing the computing resources required to complete successful management of the group-based communication channel, reducing user frustration, and enabling management of group-based communication channel(s) in circumstances where granting permission to the authenticated user account for accessing the group-based communication channels would applicable policies, laws, and/or data privacy and/or data security policies.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "identifier" refers to electronically managed information that is uniquely correlated with (i.e., identifies) a particular data object, set of data, or information. In some embodiments, an identifier includes one or more of a binary data value, a numerical data value, ASCII text, text encoded via another encoding schema, a pointer, a memory address, or a combination thereof.

The term "client device" refers to computer hardware and/or software that is configured to access a service made available by a server, such as a group-based communication server of a group-based communication system. The server is often (but not always) on another computer system, in which case the client device accesses the service by way of a network. Client devices may include, without limitation, smart phones, tablet computers, laptop computers, wearables, personal computers, enterprise computers, and the like. Client devices may be associated with a user. The association may be created by the client device transmitting registration information for user to the group-based communication server. In some instances, a client device may be temporarily associated with a user and/or authenticated user account (e.g., only when a user is logged onto the group-based communication system app). In such instances, a user may login via a client device to execute an authenticated session via the client device and associated with a particular authenticated user account.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation originated from one user who has been granted access to the group to another entity who has not been granted access to the group. Group identifiers are used to associate data, information, messages, etc., with specific groups.

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface.

The term "external resource" refers to a software application, program, platform, or service associated with a third-party controlled system, and that is configured for authenticated communication with a group-based communication system to provide particular functionality to a client device connected the group-based communication system. An external resource provides functionality not provided natively by the group-based communication system. The external resource operates on a compiled code base or repository that is separate and distinct from that which supports the group-based communication system. In some embodiments, the external resource may communicate with the group-based communication system, and vice versa, through one or more application program interfaces (APIs). In some embodiments, the external resource receives tokens and/or other authentication credentials that are used to facilitate secure communication between the external resource and the group-based communication system, such as for navigating the network security layers or protocols (e.g., network firewall protocols) securing the group-based communication system. Additionally or alternatively, in some embodiments, a group-based communication system stores one or more authentication token(s) for accessing functionality provided by the external resource. In some embodiments, access to an external resource is managed on a workspace level. In other embodiments, access to external resource is managed on an organization level.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.). In some embodiments, a group-based communication interface comprises one or more sub-interfaces, for example a sidebar interface, content interface, and flex interface, or combination thereof (as defined below).

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel. In some embodiments, a group-based communication system is configured to manage various types of group-based communication channels, which may be identified based on a "group-based communication channel type." Non-limiting examples of group-based communication channels include a single-user direct group-based communication channel (e.g., for communications between two authenticated user accounts), a multi-user direct group-based communication channel (e.g., for communications between a plurality of authenticated user accounts), a public group-based communication channel (e.g., accessible to all authenticated user accounts within a workspace), a private group-based communication channel (e.g., accessible to invited and/or specific authenticated user accounts within a workspace), an external resource group-based communication channel (e.g., for communications from and/or to an external resource accessible within a workspace or organization), or any combination thereof. The term "group-based communication channel set" refers to any number of group-based communication channels. A group-based communication channel set may be grouped by any parameter value for one or more parameters of a group-based communication channel.

In some embodiments, one group-based communication channel may be associated with one or more organization identifiers and/or workspace identifiers. In this regard, the group-based communication channel may be accessible to multiple organizations and/or workspaces. A group-based communication channel associated with more than one organization identifiers and/or workspace identifiers is a "common group-based communication channel."

The terms "group-based communication channel identifier" and "channel identifier" refer to one or more identifiers by which a group-based communication channel may be uniquely identified by a group-based communication system. A group-based communication channel identifier associated with a common group-based communication channel is a "common group-based communication channel identifier."

The term "channel owner data" refers to electronically managed information associated with a group-based communication channel that represents one or more authenticated user account identifiers, or corresponding authenticated user account information, that indicates the authenticated user account created and/or is otherwise permissioned for managing access to, information within, and/or sharing of the group-based communication channel. In some embodiments, the channel owner data identifies a single authenticated user account that created the group-based communication channel, or a single authenticated user account designated as a primary owner of the group-based communication channel. In other embodiments, the channel owner data identifies a plurality of authenticated user accounts that created and/or were designated a primary owner of the group-based communication channel.

The term "delegated management data" refers to electronically managed information associated with a group-based communication channel that represents one or more authenticated user account identifiers, or corresponding user account information, that indicates the authenticated user account has been permissioned by a primary owner for managing access to, information within, and/or sharing of the group-based communication channel. In some embodiments, for a particular group-based communication channel, a channel primary owner, as indicated by channel owner data for the group-based communication channel, is permissioned to set delegated management data for the group-based communication channel. For example, an authenticated user account indicated by the channel owner data may update the channel owner data to add one or more new authenticated user account(s) (e.g., to permission for managing the group-based communication channel) and/or remove one or more authenticated user account(s) (e.g., to remove permission for managing the group-based communication channel).

The term "channel creation timestamp data" refers to metadata associated with a group-based communication channel that indicates a date, time, and/or datetime at which the group-based communication channel was created. In some embodiments, a group-based communication system generates and/or otherwise identifies channel creation timestamp data for assigning to a newly generated group-based communication channel upon receiving a new channel request, for example from one or more client devices. It should be appreciated that the channel creation timestamp data may be embodied in any of a myriad of formats, time zones, and level of details.

The term "channel creator account data" refers to electronically managed information representing one or more authenticated user account identifiers, information, and/or the like, for authenticated user account(s) that requested creation of the group-based communication channel. In some embodiments, for example, a group-based communication system receives a channel creation request from a client device associated with an authenticated user account during a previously initiated authenticated session. In some such embodiments, the group-based communication system may identify the channel creator account data from the received channel creation request, such that the data may be assigned to the newly created group-based communication channel.

The term "channel private status data" refers to electronically managed information, associated with a group-based communication channel, that indicates whether the group-based communication channel is a private group-based communication channel. In some embodiments, the value of channel private status data indicates whether the associated group-based communication channel is a private group-based communication channel, for example where a first value indicates the channel is private and a second value indicates a channel is public.

The term "channel archive status data" refers to electronically managed information, associated with a group-based communication channel, that indicates whether the group-based communication channel is archived. A group-based communication channel that is archived may be stored such that group-based communication messages stored associated with the group-based communication channel are stored indefinitely, and/or stored subject to data retention policies different from default retention policies for the group-based communication channel. In some embodiments, the value of channel archive status data indicates whether the associated group-based communication channel is archived, for example where a first value indicates the channel is archived and a second value indicates a channel is not archived.

The term "channel workspace data" refers to electronically managed information indicating workspaces providing access to, including, and/or otherwise associated with, a group-based communication channel, and/or summary data associated with such workspace(s). In some embodiments, for example, channel workspace data includes workspace identifiers for each workspace the group-based communication channel is accessible within (e.g., an owner workspace and/or any workspace with which the channel is shared), data indicating a count of the workspaces the group-based communication channel is accessible within, or any combination thereof.

The term "channel organization-sharing status data" refers to data indicating whether a group-based communication channel is associated with all workspaces of a particular organization. In some embodiments, channel organization-sharing status data includes data indicating whether the group-based communication channel is an organization-wide channel (e.g., accessible in all workspaces of an organization), data indicating whether the group-based communication channel is an organization-wide default channel, or any combination thereof.

The term "channel member count data" refers to electronically managed information identifying a number of members having access to a group-based communication channel. In some embodiments, channel member count data includes "authenticated account member data" indicating the number of authenticated user accounts having access to the group-based communication channel, and/or "guest account member data" indicating the number of guest user accounts having access to the group-based communication channel.

The term "historical activity data" refers to electronically managed information associated with a group-based communication channel that summarizes various user-performed actions within the group-based communication channel. In some embodiments, historical activity data includes one or more of: a number of group-based communication messages posted within the group-based communication channel, a number of external resource requests within the group-based communication channel, a number of members that have posted to the group-based communication channel within a particular timeframe (or for the lifetime of the channel), and/or the like. In some embodiments, historical activity data additionally or alternative includes last activity data indicating the last management action performed for the group-based communication channel.

The term "channel share status data" refers to electronically managed information associated with a group-based communication channel representing whether the group-based communication channel has been shared with one or more organizations and/or other workspaces. In some embodiments, the channel share status data includes one or more identifiers associated with the organization(s) and/or workspace(s) with which the group-based communication channel has been shared (if any).

The term "channel guest status data" refers to electronically managed information associated with a group-based communication channel representing whether the group-based communication channel is configured to allow guest authenticated user accounts to access the group-based communication channel. In some embodiments, the channel guest status data includes one or more authenticated user account identifiers, and/or corresponding authenticated user account information, representing the guest user account(s) that have been added to the group-based communication channel (if any).

The terms "workspace data object," "group-based workspace," and "workspace" refer to electronically managed data including a group of group-based communication channels and authenticated user accounts permissioned to access one or more of the group-based communication channels therein. In some embodiments, a workspace data object is configured to enable one or more authenticated user account(s) permissioned as administrators to manage access to the workspace, for example to invite one or more authenticated user account(s) to access the workspace and/or terminate access rights to one or more authenticated user account(s) previously invited to the workspace. The term "workspace identifier" refers to one or more identifiers by which a workspace within a group-based communication system may be uniquely identified. An organization or other entity within a group-based communication system may be associated with any number of workspace identifiers.

The term "workspace identifier" refers to one or more identifiers by which a workspace within a group-based communication system may be uniquely identified. An organization or other entity within a group-based communication system may be associated with any number of workspace identifiers.

The term "organization" refers to one or more data structures by which a set of workspaces and/or group-based communication channels are associated with a particular entity. The term "organization identifier" refers to one or more items of data by which an organization may be uniquely identifier. A non-limiting example of an organization identifier comprises American Standard Code for Information Interchange (ASCII) text, a pointer, a memory address, a unique numerical and/or string value, and the like.

The term "user" refers to an individual, group of individuals, business, organization, and the like. Users referred to herein are discussed largely in connection with client device enabled activity for accessing a group-based communication interface (or set of group-based communication interfaces) of a group-based communication system. A user may be associated with one or more authenticated user accounts, as defined herein.

The term "authenticated user account" refers to information corresponding to authentication credentials (e.g., a username and password combination) for accessing particular functionality of a group-based communication system. An authenticated user account is associated with any of a variety of information, including, for example and without limitation, a user identifier, one or more group-based communication channel identifiers associated with group-based communication channels that the user has been granted access to (i.e., accessible group-based communication channels), one or more group identifiers for workspaces with which the user is associated (e.g., accessible workspaces), one or more organization identifiers for organizations with which the user is associated, an indication as to whether the user is an owner of any group-based communication channels, an indication as to whether the user has any group-based communication channel restrictions, a plurality of group-based communication messages, an emoji, a plurality of conversations, a plurality of conversation topics, an avatar, an email address, a real name (e.g., John Doe), a username (e.g., jdoe), a password, a real name, a time zone, a status, and the like. In some embodiments, a user utilizes a client device to transmit authentication credentials corresponding to a particular authenticated user account to a group-based communication system, and in response initiates an authenticated session configured to enable access to functionality and/or information accessible to the authenticated user account via the client device during the authenticated session.

The term "permission data" refers to one or more data indicators associated with authenticated user account access to functionality associated with a group-based communication channel, workspace, organization, and/or other entity. For example, in some embodiments, permission data represents whether an authenticated user account is permissioned to access a group-based workspace and/or group-based communication channel. Additionally or alternatively, in some embodiments, permission data represents whether an authenticated user account is permissioned to manage one or more settings of a group-based communication channel, manage access to a group-based communication channel, and/or share a group-based communication channel. In some embodiments, an authenticated user account is permissioned via one or more existing admin accounts to access one or more workspaces associated with a particular organization. Additionally or alternatively, in some embodiments, an authenticated user account is permissioned to access one or more group-based communication channels of a particular workspace.

It should be appreciated that one or more entities may be associated with a myriad of permission data associated with various functionality. For example, in some embodiments, an organization is associated with organization-level permission data, such as permission data for setting authenticated user account(s), and/or groups thereof, having access to functionality for managing group-based communication channels of various channel types, for accessing one or more workspaces and/or group-based communication channels associated with the organization, for sharing a workspace and/or group-based communication channel, and/or for configuring a group-based communication channel as a private group-based communication channel or public group-based communication channel. In some such embodiments, a group-based communication system similarly stores such permission data on a workspace-level, such that access to such functionality may be determined on a per-workspace basis. Additionally or alternatively, in some such embodiments, a group-based communication system similarly stores such permission data on a channel-level, such that access to such functionality may be determined on a per-channel basis. In some embodiments, certain permission data overrides other permission data, for example where permission data associated with higher-level entities is overridden by permission data associated with a lower-level entity (e.g., permission data associated with a group-based communication channel overrides permission data associated with the organization linked to the group-based communication channel).

The term "workspace management permission data" refers to one or more data objects and/or values, linked to an authenticated user account and associated with a workspace identifier, that indicates the authenticated user account is permissioned to access the workspace identified by the workspace identifier. In some embodiments, another authenticated user account previously permissioned to manage the workspace or associated organization is configured to assign workspace management permission data to one or more other authenticated user accounts.

The term "organization management permission data" refers to one or more data objects and/or values, linked to an authenticated user account and associated with an organization identifier, that indicates the authenticated user account is permissioned to access the some or all workspaces associated with the organization identified by the organization identifier. In some embodiments, another authenticated user account previously permissioned to manage the organization is configured to assign organization management permission data to one or more other authenticated user accounts.

The term "inaccessible group-based communication channel" refers to a group-based communication channel that an authenticated user account has not joined and/or otherwise is not permissioned to access. In some embodiments, a group-based communication channel is an inaccessible group-based communication channel with respect to a particular authenticated user account in a circumstance where the authenticated user account is not associated with any permission data for accessing the group-based communication channel.

The term "manageable group-based communication channel" refers to a group-based communication channel configured to be managed by an authenticated user account. In some embodiments, a group-based communication channel is identifiable as a manageable group-based communication channel, with respect to a particular authenticated user account, in a circumstance where the authenticated user account is associated with permission data for managing the group-based communication channel, and/or associated with permission data for managing a higher-level entity associated with the group-based communication channel (e.g., a workspace and/or organization). The term "manageable group-based communication channel set" refers to any number of manageable group-based communication channel(s) configured for management by an authenticated user account. In some embodiments, a manageable group-based communication channel set includes all group-based communication channels configured for management by an authenticated user account.

The term "centralized channel data" refers to information associated with one or more group-based communication channels permissioned for management by one or more authenticated user accounts. In some contexts, for example where the authenticated user account is permissioned as a workspace-level administrator, the centralized channel data includes information for group-based communication channels associated with a single workspace that the authenticated user account is permissioned to manage. In other contexts, for example where the authenticated user account is permissioned as an organization-level administrator, the centralized channel data includes information for one or more group-based communication channels for all workspaces associated with an organization that the authenticated user account is permissioned to manage.

The term "group-based communication channel metadata set" refers to information included with, derived from, and/or otherwise associated with a group-based communication channel. For example, in some embodiments, a group-based communication channel metadata set includes information to be rendered to one or more interfaces, and/or to be processed for rendering to one or more interfaces. Non-limiting examples of a group-based communication channel metadata set includes: channel creation timestamp data, channel creator account data, historical activity data, channel share status data, channel guest status data, a channel user count, a channel message count, and channel integrations data associated with one or more external resources.

The term "centralized channel management dashboard" refers to a specially configured user interface including centralized channel data associated with at least one authenticated user account. In some embodiments, the centralized channel management dashboard is configured to include one or more group-based communication channel metadata set(s) for group-based communication channels that the authenticated user account is permissioned to manage. Additionally or alternatively, in some embodiments, the centralized channel management dashboard includes one or more channel management action interface elements.

The term "centralized channel management request" refers to electronically managed data transmitted from a client device to a group-based communication system indicating a user request for receiving channel information associated with any of group-based communication channels manageable by an authenticated user account. In some embodiments, response data received in response to the centralized channel management request is configured to cause rendering of a centralized channel dashboard to a display associated with the client device. In some embodiments, the centralized channel management request includes at least an authenticated user account identifier and/or other data for use in retrieving manageable group-based communication channels for rendering via a centralized channel management dashboard, or associated data for use in rendering the corresponding centralized channel dashboard.

The term "channel management action" refers to one or more processes for updating data embodying or associated with a group-based communication channel to change access to, storage of, and/or other functionality associated with the group-based communication channel. In some embodiments, a channel management action is initiated by a group-based communication system in response to receiving a "channel management request." In some embodiments, the channel management action includes one or more identifiers uniquely identifying the channel management action to be initiated.

The term "channel posting rule action" refers to a channel management action for updating electronically managed information associated with a group-based communication channel to alter rules for posting group-based communication messages to the channels by members of the group-based communication channel. In at least one example context, a channel posting rule action alters one or more setting parameter value(s) associated with the group-based communication channel to limit posting only to specific user groups (e.g., administrator user accounts only, a defined authenticated user account and/or guest account group only, or the like), types of group-based communication message that may be posted within the group-based communication channel (e.g., image messages only, external resource messages only, and/or the like), and/or restricting attachments to group-based communication messages (e.g., no messages with attachments may be posted within the group-based communication channel). It should be appreciated that a channel posting rule action may change one or more values to effect any desired change in broadening and/or narrowing one or more restrictions on posting group-based communication messages within a group-based communication channel.

The term "user access action" refers to a channel management action for updating electronically managed data associated with permission to access a group-based communication channel. For example, in some embodiments, a user access action includes generating permission data associated with one or more authenticated user accounts to grant access to the group-based communication channel, and/or revoking permission data associated with one or more authenticated user accounts to revoke access to the group-based communication channel. Additionally or alternatively, in some embodiments, a user access action grants and/or revokes access to a group-based communication channel for one or more guest user accounts.

The term "channel defaulting action" refers to a channel management action for updating electronically managed information associated with a group-based communication channel for setting default access to the group-based communication channel within a particular workspace, subset of workspaces, and/or all workspaces for an organization. In some embodiments, for example, a channel defaulting action includes setting one or more electronic data values indicating whether the group-based communication channel should be provided as a default within one or more workspaces.

The term "channel archive action" refers to a channel management action for updating electronically managed data associated with storing a group-based communication channel as archived. In some embodiments, a channel archive action includes setting one or more electronic data values indicating whether the group-based communication channel should be stored as archived. In some embodiments, in a circumstance where a group-based communication channel is indicated for storing as archived, group-based communication messages stored associated with the group-based communication channel (e.g., posted within the group-based communication channel) are backed up in a second storage by a group-based communication system, and/or are stored according to a second data retention policy different than a default data retention policy (e.g., to be stored indefinitely rather than deleted after a certain time period).

The term "channel rename action" refers to a channel management action for updating electronically managed data representing a user identifiable name for a group-based communication channel. In some embodiments, a channel rename action includes updating a data value for a name parameter stored associated with the group-based communication channel.

The term "channel share action" refers to a channel management action for updating whether a group-based communication channel is shared with one or more third-party organizations, and/or with one or more other workspaces associated with an owner organization for the group-based communication channel. In some embodiments, a channel share action includes granting and/or revoking permission data for one or more third-party organizations, such that authenticated user accounts associated with the third-party organization(s) are permissioned to access the group-based communication channel and/or revoke such permission to access the group-based communication channel. Additionally or alternatively, in some embodiments, a channel share action includes granting and/or revoking permission data for one or more other workspaces for an organization, such as an owner organization, associated with the group-based communication channel, such that authenticated user accounts permissioned to access the workspace(s) with which the group-based communication channel is shared may further access the group-based communication channel.

The term "channel delete action" refers to a channel management action for updating the existence of a group-based communication channel. In some embodiments, a channel delete action includes deleting data records embodying the group-based communication channel, and/or group-based communication messages associated with the group-based communication channel, from one or more datastores. Alternatively or additionally, in some embodiments, a channel delete action includes making data embodying the group-based communication channel, and/or group-based communication messages associated with the group-based communication channel, inaccessible. In yet some other embodiments, a channel delete action includes marking one or more group-based communication channels for deletion at another time (e.g., after a set time period), which may or may not be revocable to restore the group-based communication channel.

The term "channel management action interface element" refers to one or more components of an interface configured to initiate one or more group-based communication channel management actions. In some embodiments, a channel management action interface element is configured to receive user interaction indicating a user desire to initiate an associated action. In some embodiments, a channel management action interface element is rendered for a specific channel management action (e.g., a delete button, a rename button, and the like). In other embodiments, a channel management action interface element is rendered to provide sub-interfaces each associated with a particular channel management action interface element (e.g., a dropdown menu, modal interface, and/or the like).

The term "channel management data" refers to electronically managed information representing a user request to perform one or more channel management actions, and that includes one or more data parameters for processing to execute the channel management action. In some embodiments, channel management data is transmitted from a client device to a group-based communication system in response to user interaction with a channel management action interface element. In some embodiments, channel management data includes at least an action identifier that represents the requested type of channel management action requested (e.g., a channel rename action, channel delete action, or the like). Additionally or alternatively, in some embodiments, channel management data includes at least a channel identifier for a group-based communication channel associated with the channel management data.

The term "user interaction" refers to user engagement with a client device, peripheral, and/or associated interface. Non-limiting examples of user interactions include user engagement of a touch area or touch screen, a tactile gesture (e.g., swipe, long press, and the like), a motion gesture (e.g., moving the user's body and/or a device in a predefined motion), a virtual button press, a mouse click, a scroll, a keyboard press, a peripheral button press, a controller input, a joystick input, a voice command or other audio interaction, a remote control input, and/or or a combination thereof. In some embodiments, user interaction is associated with particular functionality based on a currently rendered user interface, for example based on a location and/or type of user interaction performed. The term "user interaction data" refers to data generated based on a user interaction. In some embodiments, user interaction data is processable by a processor and/or corresponding circuitry, to identify the user interaction and/or associated data objects, and/or process the associated data objects.

The term "channel privacy access data" refers to electronically managed information, associated with a group-based communication channel, representing the organizations, authenticated user accounts, external resources, and/or other entities that have access to group-based communication messages within the group-based communication channel. In this regard, in some embodiments, the channel privacy access data includes any number of authenticated user account identifiers, organization identifiers, workspace identifiers, external resource identifiers, and/or the like. In some embodiments, a group-based communication system is configured to derive channel privacy access data for a particular group-based communication channel based on the channel type, one or more permissions settings, channel share status data, authenticated user account permission data, and/or any combination thereof.

The term "selected channel information request" refers to electronically managed information indicating a user request for channel privacy access data associated with a group-based communication channel. In some embodiments, the selected channel information request is transmitted from a client device to a group-based communication system, for example in response to user interaction via the client device. In some embodiments, a selected channel information request includes at least a group-based communication channel identifier associated with the group-based communication channel for which channel privacy access data is to be retrieved.

The term "channel privacy notification information" refers to channel privacy access data, a subset of channel privacy access data, associated data, and/or data derived therefrom, for rendering associated with a group-based communication channel to an interface by a client device. In some embodiments, channel privacy notification information includes human-readable text representing entities having access to the group-based communication channel based on corresponding channel privacy access data. Additionally or alternatively, in some embodiments, channel privacy notification information includes one or more images for rendering associated with the group-based communication channel, for example avatar images and/or profile images associated with authenticated user accounts, workspaces, organizations, and/or the like, having access to the group-based communication channel.

Example System Architecture of Embodiments

The methods, apparatuses, systems, and computer program products of the present disclosure may be embodied by any variety of devices. For example, a method, apparatus, system, and computer program product of an example embodiment may be embodied by a fixed computing device, such as a personal computer, computing server, computing workstation, or a combination thereof. Further, an example embodiment may be embodied by any of a variety of mobile terminals, mobile telephones, smartphones, laptop computers, tablet computers, or any combination of the aforementioned devices.

In this regard, FIG. 1 discloses an example computing system in which embodiments of the present disclosure may operate. FIG. 1 illustrates an overview for a system configured for centralized channel management. Specifically, the system includes a plurality of external resources, specifically external resource 106A, external resource 106B, and external resource 106C (collectively "external resources 106"). Additionally, as illustrated, the system includes a plurality of user devices, specifically client device 104A, client device 104B, and client device 104C (collectively "client devices 104"). Additionally, as illustrated, the system includes group-based communication system 102. The group-based communication system 102 is in communication with the external resources 106 and the client devices 104 over a communications network, specifically communications network 108.

The group-based communication system 102 comprises a group-based communication server 102A ("server 102A") and a group-based communication datastore 102B ("datastore 102B"). The server 102A may be configured to communicate with the datastore 102B to enable the group-based communication system 102 to provide the functionality described herein. In some embodiments, the server 102A and datastore 102B are connected within one or more local environment, for example at a location controlled an owner and/or controller of the group-based communication system 102. In yet other embodiments, the server 102A and the datastore 102B are located remotely from one another, and/or include one or more cloud environments separate from one another.

The server 102A may be embodied by a computer or a plurality of computers. The server 102A may provide various functionality associated with receiving group-based communication messages or data associated therewith, generating, storing, and/or maintaining group-based communication messages, and/or transmitting group-based communication messages to one or more client device(s), such as the client devices 104. Additionally or alternatively, in some embodiments, the server 102A provides various additional functionality through communication with one or more external resources, such as the external resources 106. In some such embodiments, the server 102A communicates with any of the external resources 106 to facilitate transmission of external resource information to one or more client device(s), which may be transmitted via one or more group-based communication interfaces automatically or in response to a user request. For example, the server 102A may be operable to receive and post, or transmit, group-based communication messages provided by one or more of the client devices 104 and/or external resources 106 to a group-based communication channel, and perform one or more associated actions accordingly.

Additionally or alternatively, in some embodiments, the server 102A is configured to enable centralized channel management of one or more group-based communication channels. In this regard, the server 102A may be configured to authenticate a user identity associated with a user of one of the client devices 104, for example to initiate an authenticated session associated with an authenticated user account. Further, the server 102A may be configured to identify one or more group-based communication channels that the authenticated user account is permissioned for managing, and in some embodiments to provide some such information to the client device. In this regard, the server 102A may process one or more requests and provide corresponding information associated with functionality for managing the group-based communication channels provided as associated with the authenticated user account. In some such embodiments, the server 102A configures and/or otherwise causes rendering of one or more interfaces associated with such functionality. For example, in some embodiments, the server 102A is configured to, during an authenticated session associated with an authenticated user account, cause rendering of one or more group-based communication interfaces including group-based communication channels associated with permission data for management by the authenticated user account, and/or for performing one or more actions for any number of group-based communication channels included in the interface. In some such embodiments, the one or more group-based communication interfaces includes one or more interface elements for manipulating the data displayed associated with the identified group-based communication channels. For example, the server 102A may be configured to enable filtering of the identified group-based communication channels, performing one or more actions for a subset of the group-based communication channels (e.g., all group-based communication channels associated with one or more parameter values, including a channel type, associated workspace identifier, sharing permissions, or the like). It should be appreciated that the server 102A may be configured to cause rendering of a group-based communication interface, and/or one or more associated interfaces, comprising one or more user interface elements for performing any of the functionality for centralized channel management described herein, alone or in any combination with other interface elements for other functionality described herein.

The datastore 102B may be embodied as any number of data storage devices, such as one or more local storage device(s), cloud storage device(s), network attached storage ("NAS") device or a plurality of NAS devices, or as a separate database server of plurality of servers. The datastore 102B includes information accessed by, received by, and/or otherwise generated and/or processed by the server 102A to facilitate functionality provided by the group-based communication system 102. For example, the datastore 102B may be configured to store, without limitation, a plurality of group-based communications associated with a plurality of workspaces, group-based communication channels, authenticated user accounts, external resources, and/or the like. Additionally or alternatively, the datastore 102B may be configured to store authentication credentials associated with various authenticated user accounts, for example to enable a client device to initiate an authenticated session with the group-based communication system 102 via one or more authentication processes, such as by providing the authentication credentials and comparing to the stored authentication credentials, and to link the client device with an authenticated user account for enabling the authenticated session.

In some embodiments, the datastore 102B is configured at least for storing data associated with administrator permissions for one or more authenticated user accounts, and for the hierarchy of entities to enable functionality of the group-based communication system 102. For example, in at least some embodiments, the datastore 102B configured to store at least one or more organizations associated with one or more workspaces, the workspaces stored further associated with one or more group-based communication channel accessible therein, and each authenticated user account associated with data indicating whether the authenticated user account has been given permissions as an administrator user account for one or more of the organization, workspace, and/or group-based communication channels. In this regard, the datastore 102B is configured to enable identification of one or more group-based communication channels permissioned for management by a particular authenticated user account. In some such embodiments, the datastore 102B is configured to be queried to retrieve such information for a particular authenticated user account, for example using a user account identifier for the authenticated user account. In at least one example context, the server 102A is configured to communicate with the datastore 102B for performing such a query for each user that accesses centralized channel management functionality of the server 102A.

Each of the client devices 104 may be embodied by any of a variety of computing devices as defined above. Electronic data received by the group-based communication server 102A from the client devices 104 may be provided in various forms and via various methods for processing. For example, the client devices 104 may include desktop computers, laptop computers, smartphones, netbooks, tablet computers, wearables, and/or the like. Each of the client devices 104 may include a networking interface to enable such communications, and/or each of the client devices 104 may be associated with a device configured with a network interface to enable such communications (e.g., a wearable device connected to a smartphone). The client devices 104 may be configured to enable communications over various networks utilizing various networking hardware, software, and/or firmware (e.g., Bluetooth between a smartphone and associated wearable, a carrier network between a smartphone and a group-based communication system and/or between a wearable and a group-based communication system, and/or one or more wireless and/or wireless networks for communicating via the Internet between a client device and a group-based communication system).

In an example context, the client devices 104 may execute an application or "app" to enable interaction with the group-based communication system 102. Such applications are typically designed for execution via a computing device dependent on the operating system and/or other configurations associated with the computing device. For example, an application may be provided that executes on mobile device operating systems such as iOS®, Android®, or Windows®. Alternatively, an application may be provided that executes on a personal computer operating system, such as Windows®, macOS®, Linux®, or another operating system executed on a laptop device, desktop device, or terminal device. These platforms typically provide frameworks that allow applications to communicate with one another and/or with particular hardware and/or software components of the client device. For example, the mobile operating systems and/or personal computer operating systems named above each provide frameworks for interacting with location services circuitry, wired and/or wireless network interfaces, user contacts, and other applications. In an example context, the application is embodied by a group-based communication service application provided by the group-based communication system. Communication with hardware and software modules outside of the application is typically provided via one or more application programming interfaces (APIs) configured by the operating system for the client device and/or provided via an external resource.

Alternatively or additionally, the client devices 104 may interact with the group-based communication system 102 via a web application. In an example context, the web application is embodied by a web browser executed via one of the client devices 104. As yet another example, the client devices 104 may include various hardware, firmware, and/or software designed to interface with the group-based communication system 102. Each of the client devices 104 may be associated with an authenticated session, for example after a user undergoes one or more authentication processes, that links each of the client devices 104 with a corresponding authenticated user account for the duration of the authenticated session. It should be appreciated that, in some embodiments, any of the client devices 104 may be used to access data associated with any authenticated account upon providing the requisite authentication credentials for the authenticated user account (e.g., a username and password combination) or by completing any other authentication process.

Each of the external resources 106 represents an external system, resource, service, software application, computer, and/or the like, that is accessible by a group-based communication system 102 for providing associated functionality to one or more of the client devices 104 during an authenticated session. In some embodiments, one or more of the external resources 106 (or a specific subset thereof) provide specific functionality via one or more group-based communication interfaces provided by the group-based communication system 102 and rendered to one or more of the client devices 104. For example, the group-based communication system 102 may access functionality provided by each of the external resources 106 via one or more APIs. An external resource of the external resources 106 may provide specific functionality and/or a specific service integrated into a group-based communication interface. In one example, one or more of the external resources 106 may be a validated software source code repository, or the like, which members of a particular group-based communication workspace may collectively access as they collaborate to develop a new software application. Additionally or alternatively, in another context, one of the external resources 106 may provide cloud storage for documents and/or the like. An external resource of the external resources 106 may be embodied in a variety of ways utilizing a variety of computing devices, for example an external server remote from the group-based communication system 102 and accessible using transmissions over the communications network 108 (e.g., over the Internet, for example).

In some embodiments, group-based communication system is configured to access an external resource of the external resources 106 utilizing an external resource identifier. The external resource identifier may include, or otherwise be associated with and retrievable together with, an external resource access token associated with the external resource and/or a corresponding group-based communication system, workspace, and/or authenticated user account. A group-based communication system 102 may store one or more external resource identifiers including or associated with external resource access token(s) to enable API requests to the external resource, which may be tied with a specific external resource user account linked to a particular authenticated user account. For example, in this regard, an authenticated user account of the group-based communication system may be linked to a particular external resource user account, such that a user may access personalized external resource functionality.

In some embodiments, user may access an external resource 106 via one or more workspaces and/or specific group-based communication channels maintained by the group-based communication system 102. In this regard, a user may add an external resource of the external resources 106 to a workspace to make functionality associated with the external resource accessible from within the workspace. To provide such functionality, the user may communicate with the group-based communication system 102 to cause the group-based communication system to communicate with the external resource to access such functionality. The group-based communication system 102 thus enables the user to access external resource functionality without requiring direct communication with the external resources 106, and may make the functionality of the external resources 106 accessible via communications to one or more group-based communication channels.

In some embodiments of an exemplary group-based communication system 102, a group-based communication message may be sent from a client device of the client devices 104 to a group-based communication system 102. In various implementations, the group-based communication message may be sent to the group-based communication system 102 over communications network 108, for example directly by one of the client devices 104. In other embodiments, the group-based communication message may be sent to group-based communication system 102 via one or more intermediaries, such as a messaging server, relay server, and/or the like. In at least one example implementation, the group-based communication message may include data such as a message identifier, sender/author account identifier, a group identifier, a group-based communication channel identifier, communication content data (e.g., text, emojis, images, links), attachment data (e.g., files), communication hierarchy data (e.g., the group-based communication message may be a reply to another group-based communication), third-party metadata (e.g., an external resource identifier), external resource content, and/or the like.

In one embodiment, one of the client devices 104 may provide the following example group-based communication substantially in the form of a (Secure) Hypertext Transfer Protocol ("HTTP(S)") POST message including eXtensible Markup Language ("XML") formatted data, embodying a particular request for authenticating user account details to initiate an authenticated session, as provided below:

```
POST /authrequest.php HTTP/1.1
Host: www.server.com
Content-Type: Application/XML
Content-Length: 667
<?XML version="1.0" encoding="UTF-8"?>
<auth_request>
    <timestamp>2020-12-31 23:59:59</timestamp>
    <user accounts details>
        <user_account_credentials>
            <user_name>ID_user_1</user_name>
            <password>abc123</password>
            //OPTIONAL <cookie>cookieID</cookie>
            //OPTIONAL
                <digital_cert_link>www.mydigitalcertificate.com/ JohnDoeDaDoeDoe@gmail.com/mycertifcate.dc</digital_cert_link>
            //OPTIONAL <digital_certificate>_DATA_</digital_certificate>
        </user account credentials>
</user_accounts_details>
<client_details>//iOS Client with App and Webkit
    //it should be noted that although several client details
    //sections are provided to show example variants of client
    //sources, further messages will include only one to save
    //space
    <client_IP>10.0.0.123</client_IP>
    <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXD</client_UDID>
    <client_OS>iOS</client_OS>
    <client_OS_version>7.1.1</client_OS_version>
    <client app_type>app with webkit</client app_type>
    <app_installed flag>true</app_installed_flag>
    <app_name>nickname.app</app_name>
    <app_version>1.0</app_version>
    <app_webkit_name>Mobile Safari</client_webkit_name>
    <client_version>537.51.2</client_version>
</client_details>
<client_details>//iOS Client with Webbrowser
    <client_IP>10.0.0.123</client_IP>
    <user_agent_string>Mozilla/5.0 (iPhone; CPU iPhone OS 7_1_1 like Mac OS X) AppleWebKit/537.51.2 (KHTML, like Gecko) Version/7.0 Mobile/11D201 Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXD</client_UDID>
    <client_OS>iOS</client_OS>
    <client_OS_version>7.1.1</client_OS_version>
    <client app_type>web browser</client_app_type>
    <client_name>Mobile Safari</client_name>
    <client_version>9537.53</client_version>
</client_details>
<client_details>//Android Client with Webbrowser
    <client_IP>10.0.0.123</client_IP>
    <user_agent_string>Mozilla/5.0 (Linux; U; Android 4.0.4; en-us; Nexus S Build/IMM76D) AppleWebKit/534.30 (KHTML, like Gecko) Version/4.0 Mobile Safari/534.30</user agent string>
```

```
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details>//Mac Desktop with Webbrowser
        <client_IP>10.0.0.123</client_IP>
        <user_agent_string>Mozilla/5.0 (Macintosh; Intel Mac OS X 10_9_3) AppleWebKit/537.75.14 (KHTML, like Gecko) Version/7.0.3 Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
        <channel_identifier>ID_channel_1</channel_identifier>
        <body contents>That is an interesting invention. I have attached a copy our patent policy.</body contents>
        <attachments>patent_policy.pdf</attachments>
    </message>
</auth_request>
```

The group-based communication system 102 comprises at least one group-based communication server 102A that may create a storage request data object based upon the received message to facilitate message indexing and storage in a group-based communication datastore 102B. In one implementation, the storage request data object may include data such as a communication identifier, a group identifier, a group-based communication channel identifier, a sending user account identifier, topics, responses, communication contents (i.e., body contents), attachments, communication hierarchy data, third party metadata, conversation primitive data, and/or the like. For example, the group-based communication server 102A may provide the following example storage request data object, substantially in the form of a HTTP(S) POST message including XML-formatted data, for example embodying a particular request for posting a group-based communication, as provided below:

```
POST /storage_message.php HTTP/1.1
Host: www.server.com
Content-Type: Application/XML
Content-Length: 667
<?XML version="1.0" encoding="UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>disclosures</topic>
        <topic>patents</topic>
        <topic>policies</topic>
    </topics>
    <responses>
        <response>liked by ID_user_2</response>
        <response>starred by ID user 3</response>
    </responses>
    <body contents>That is an interesting disclosure. I have attached a copy our patent policy.</body contents>
    <attachments>patent_policy.pdf</attachments>
    <conversation_primitive>
        conversation includes messages: ID_message_8, ID_message_9, ID_message_10, ID_message_11, ID_message_12
    </conversation_primitive>
</storage_message>
```

In some embodiments, a sending user account identifier may be associated with the message communication. In one implementation, the message may be parsed (e.g., using PHP—i.e., the script language derived from Personal Home Page Tools—commands) to determine a sending user account identifier of the user who sent the group-based communication.

In some embodiments, topics may be associated with the group-based communication. In one implementation, the communication contents may be parsed (e.g., using PUP commands) to determine topics discussed in the group-based communication. For example, hashtags in the group-based communication may indicate topics associated with the group-based communication. In another example, the group-based communication may be analyzed (e.g., by itself, with other group-based communications in a conversation primitive) or parsed using a machine learning technique, such as topic modeling, to determine topics associated with the group-based communication.

In some embodiments, data indicating responses may be associated with the group-based communication. For example, responses to the group-based communication by other users may include reactions (e.g., selection of an emoji associated with the group-based communication, selection of a "like" button associated with the group-based communication), clicking on a hyperlink embedded in the group-based communication, replying to the group-based communication (e.g., posting a group-based communication to the group-based communication channel in response to the communication), downloading a file associated with the group-based communication, sharing the group-based communication from one group-based communication channel to another group-based communication channel, pinning the group-based communication, starring the group-based communication, and/or the like. In one implementation, data regarding responses to the group-based communication by other users may be included with the group-based communication, and the group-based communication may be parsed (e.g., using PUP commands) to determine the responses. In another implementation, data regarding responses to the group-based communication may be retrieved from a database. For example, data regarding responses to the group-based communication may be retrieved via a MySQL database command similar to the following:
SELECT messageResponses
FROM MSM_Message
WHERE messageID=ID_message_10.

For example, data regarding responses to the group-based communication message may be used to determine context for the group-based communication (e.g., a social score for the group-based communication from the perspective of some user). In another example, data regarding responses to the group-based communication may be analyzed to determine context regarding the user (e.g., the user's expertise in a topic may be determined based on the responses to the user's group-based communication regarding the topic).

In some embodiments, attachments may be included with the group-based communication. If there are attachments, files may be associated with the group-based communication. In one implementation, the group-based communication may be parsed (e.g., using PUP commands) to determine file names of the attachments. For example, file contents may be analyzed to determine context for the group-based communication message (e.g., a patent policy document may indicate that the group-based communication is associated with the topic "patents").

In some embodiments, third-party metadata may be associated with the group-based communication. For example, third-party metadata may provide additional context regarding the group-based communication message or the user that is specific to a company, group, a group-based communication workspace, a group-based communication channel, and/or the like. In one implementation, the group-based communication message may be parsed (e.g., using PUP commands) to determine third-party metadata. For example, third-party metadata may indicate whether the user who sent the group-based communication is an authorized representative of the group-based communication channel (e.g., an authorized representative may be authorized by the company to respond to questions in the group-based communication channel).

In some embodiments, a conversation primitive may be associated with the group-based communication. In one implementation, a conversation primitive is an element used to analyze, index, store, and/or the like communications. For example, the group-based communication message may be analyzed by itself, and may form its own conversation primitive. In another example, the group-based communication may be analyzed along with other group-based communication messages that make up a conversation, and the group-based communication messages that make up the conversation may form a conversation primitive. In one implementation, the conversation primitive may be determined as the group-based communication message, a specified number (e.g., two) of preceding group-based communication messages and/or a specified number (e.g., two) of following group-based communication messages. In another implementation, the conversation primitive may be determined based on analysis of topics discussed in the group-based communication message and other group-based communication messages (e.g., in the group-based communication channel) and/or proximity (e.g., communication send order proximity, communication send time proximity) of these group-based communication messages.

In embodiments, various metadata, determined as described above, and/or the contents of the group-based communication message may be used to index the communication (e.g., using the conversation primitive) to facilitate various facets of searching (i.e., search queries that return results from group-based communication datastore 102B). In at least one example implementation, a storage request data object may be sent from group-based communication server 102A to facilitate indexing in group-based communication datastore 102B. In another implementation, metadata associated with the group-based communication may be determined and the communication may be indexed in group-based communication datastore 102B. In an example embodiment, the group-based communication may be indexed such that a company's or a group's communications are indexed separately (e.g., in a separate index associated with the group and/or company that is not shared with other groups and/or companies). In one implementation, group-based communications may be indexed at a separate distributed repository (e.g., to facilitate data isolation for security purposes).

If there are attachments associated with the group-based communication, file contents of the associated files may be used to index such files in group-based communication datastore 102B to facilitate searching. In at least one embodiment, the files may be indexed such that a particular organization's, company's or a group's files are indexed at a separate distributed repository.

Example Apparatuses of the Present Disclosure

The group-based communication system 102 may be embodied by one or more computing systems, such as the apparatus 200 shown in FIG. 2. The apparatus 200 may include a processor 202, memory 204, input/output module 206, communications module 208, group-based communication module 210, and central channel management module 212. The apparatus 200 may be configured, using one or more of the modules to execute the operations described herein.

Although the components are described with respect to functional limitations, it should be understood that the particular implementations necessarily include the use of particular hardware. It should also be understood that certain of the components described herein may include similar or common hardware. For example, two modules may both leverage use of the same processor, network interface, storage medium, or the like to perform their associated functions, such that duplicate hardware is not required for each module. The use of the term "module" and/or the term "circuitry" as used herein with respect to components of the apparatus 200 should therefore be understood to include particular hardware configured to perform the functions associated with the particular module as described herein.

Additionally or alternatively, the terms "module" and "circuitry" should be understood broadly to include hardware and, in some embodiments, software and/or firmware for configuring the hardware. For example, in some embodiments, "module" and "circuitry" may include processing circuitry, storage media, network interfaces, input/output devices, and the like. In some embodiments, other elements of the apparatus 200 may provide or supplement the functionality of the particular module. For example, the processor 202 may provide processing functionality, the memory 204 may provide storage functionality, the communications module 208 may provide network interface functionality, and the like, to one or more of the other modules.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus 200 to carry out various functions in accordance with example embodiments of the present disclosure.

The processor 202 may be embodied in any one of a myriad of ways and may, for example, include one or more processing devices configured to perform independently. Additionally or alternatively, the processor 202 may include one or more processors configured in tandem via a bus to enable independent execution of instructions, pipelining, and/or multithreading. The use of the terms "processor," "processing module," and "processing circuitry" may be understood to include a single-core processor, a multi-core processor, multiple processors internal to the apparatus, other central processing unit ("CPU"), microprocessor, integrated circuit, and/or remote or "cloud" processors.

In an example embodiment, the processor 202 may be configured to execute computer-coded instructions stored in the memory 204 or otherwise accessible to the processor. Alternatively, or additionally, the processor 202 may be configured to execute hard-coded functionality. As such, whether configured by hardware or software means, or by a combination thereof, the processor 202 may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As one example context, the processor 202 may be configured to provide group-based communication system functionality. Additionally or alternatively, the processor 202 may be configured to facilitate storing of data associated with group-based communication system functionality (e.g., organization data, workspace data, channel data, and/or group-based communication message data), and enable management of said stored data in a centralized manner. For example, the processor 202 may be configured to perform an authentication process and initiate an authenticated session associated with a particular authenticated user account. Additionally or alternatively, the processor 202 may be configured to identify group-based communication channels permissioned for management by the authenticated user account, for example where the authenticated user account is an administrator user account based on stored administrator data, such as owner account data and/or delegated account data. In yet some embodiments, the processor is further configured to identify particular information associated with each identified group-based communication channel, for example one or more external resources available within the group-based communication channel, one or more authenticated user accounts, or groups of authenticated user accounts, having access to the group-based communication channel, and/or other channel information based on metadata associated with the group-based communication channel and/or data transmitted within the group-based communication channel (e.g., one or more group-based communication messages). The processor 202 may additionally or alternatively be configured to cause rendering of group-based communication interfaces enabling functionality for centralized channel management as described herein.

In some embodiments, the apparatus 200 includes input/output module 206 that may, in turn, be in communication with processor 202 to provide output to the user and, in some embodiments, to receive an indication of a user input. The input/output module 206 may comprise a user interface (e.g., a group-based communication interface) and may include a display to which the user interface is rendered. In some embodiments, the input/output module 206 may comprise a web user interface, a mobile application (e.g., a mobile group-based communication service application), a desktop application (e.g., a desktop group-based communication service application), a linked or networked client device, a kiosk, or the like. In some embodiments, the input/output module 206 may also include a keyboard, a mouse, a joystick, a touch screen, touch areas, soft keys, a microphone, a speaker, or other input/output mechanisms. The processor and/or user interface module comprising the processor, for example processor 202, may be configured to control one or more functions of one or more user interface elements through computer program instructions (e.g., software and/or firmware) stored on a memory accessible to the processor (e.g., memory 204, and/or the like). In some embodiments, the input/output module 206 comprises a client device with which a user communicates with the apparatus 200.

The communications module 208 may be any means such as a device or circuitry embodied in either hardware or a combination of hardware and software that is configured to receive and/or transmit data from/to a network and/or any other device, circuitry, or module in communication with the apparatus 200. In this regard, the communications module 208 may include, for example, at least a network interface for enabling communications with a wired or wireless communication network. For example, the communications module 208 may include one or more network interface cards, antennas, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication module 210 includes hardware, software, firmware, and/or a combination thereof, configured to support functionality associated with group-based communication system 102. The group-based communication module 210 may utilize processing circuitry, such as the processor 202, to perform these actions. In some embodiments, the group-based communication module 210 includes hardware, software, firmware, or a combination thereof, to process group-based communication messages posted by one or more authenticated user account(s) to various group-based communication channels, and/or posted by one or more external resource(s) to various group-based communication channel(s), transmit corresponding information to one or more client device(s) and/or external resources for processing. For example, in this regard, the group-based communication module 210 may provide functionality to enable the apparatus 200 to function as an intermediary service between the various users associated with disparate client devices, and the various users and external resources providing supplemental functionality built over the group-based communication system. In some embodiments, the group-based communication module 210 may additionally and/or alternatively be configured to send data and/or receive data from one or more group-based communication datastore(s), for example datastore 102B. In some implementations, the sent and/or received data may be data objects embodying one or more group-based communications (e.g., messages, files, links, etc.) organized among a plurality of group-based communication channels. Additionally or alternatively, the group-based communication module 210 may provide functionality for authenticating authentication credentials to initiate an authenticated session associated with a corresponding client device. During the authenticated session, the apparatus 200, for example via the group-based communication module 210 may provide native communication functionality and/or functionality associated with the external resources. It should be appreciated that, in some embodiments, the group-based communication module 210 may include a separate processor, specially configured field programmable gate array (FPGA), or a specially configured application-specific integrated circuit (ASIC).

The central channel management module 212 includes hardware, software, firmware, and/or a combination thereof, configured to support functionality associated with management of one or more entities within the group-based communication system, for example centralized channel management via the apparatus 200. In at least one example embodiment, the central channel management module 212 is configured via hardware, software, firmware, or a combination thereof, to receive a channel management request associated with one or more group-based communication channels. In some embodiments, the channel management request includes or is otherwise associated with an authenticated user account identifier for the authenticated user account that originated the request. Additionally or alternatively, in some example embodiments, the centralized channel management module is configured to process one or more received channel management requests, for example to identify requested data associated with one or more group-based communication channels configured for management by the identified authenticated user account and provide such requested data as a response to the request, or to execute one or more data management operations (e.g., granting new permission data for management and/or access of a channel, revoking permission data for management and/or access of a channel, deleting and/or editing group-based communication messages stored within a group-based communication channel, removing and/or adding connections with one or more external resources within a group-based communication channel, and/or the like), and providing a response to the request based on whether processing was determined successful. The channel management request(s) may be associated with an identified group-based communication channel set, for example by including a plurality of channel identifiers associated with group-based communication channels to be managed. Alternatively or additionally, the channel management request(s) may be include data for use in identifying a group-based communication channel set for management, for example a group-based communication channel type for use in identifying all group-based communication channels of the group-based communication type that are manageable by the authenticated user account.

Additionally or alternatively, in some embodiments, the central channel management module 212 includes software, hardware, firmware, and/or a combination thereof, for enabling rendering of a centralized channel management dashboard. For example, the central channel management module 212 may be configured to cause rendering of a centralized channel management dashboard upon request by a user via a client device, for example by receiving. In some such embodiments, the centralized channel management request may include, or otherwise be associated with, an authenticated user account identifier that submitted or otherwise originated the request, for example for use in identifying the group-based communication channels that the authenticated user account is permissioned to manage. Additionally or alternatively, in some embodiments, the central channel management module 212 includes hardware, software, firmware, or a combination thereof, to identify data for use in causing rendering of the centralized channel management dashboard, for example a group-based communication channel metadata set for the group-based communication channels permissioned for management by the authenticated user account. In some embodiments, the central channel management module 212 additionally or alternative includes hardware, software, firmware, and/or a combination thereof, to communicate with one or more datastores for processing received requests, for example to communicate with one or more datastores storing group-based communication channel metadata and/or content data, for example to initiate one or more data queries, and/or to receive and parse response data associated with the data queries.

In some embodiments, the central channel management module 212, alone or in conjunction with one or more other modules such as the processor 202 and/or input/output module 206, include hardware, software, and/or a combination thereof, configured to generate one or more interfaces including specially configured interface elements for initiating and/or otherwise causing such operations described above, and/or providing such interfaces for interaction by one or more users, such as through communication with one or more client device(s), displays, and/or the like. It should be appreciated that, in some embodiments, the central channel management module 212 may include a separate processor, specially configured FPGA, or a specially configured ASIC.

In some embodiments, one or more of the aforementioned components is combined to form a single module. For example, in some embodiments, the group-based communication module 210 and/or central channel management module 212, and/or processor 202, are combined into a single module. The combined module may be configured to perform some or all of the functionality described above with respect to the individual modules. Additionally or alternatively, in some embodiments, one or more of the modules described above may be configured to perform one or more of the actions described with respect to one or more of the other modules.

One of the client devices 104 may be embodied by one or more user devices, such as the apparatus 300 shown in FIG. 3. The apparatus 300 may include a processor 302, memory 304, input/output module 306, communications module 308, and group-based client module 310. The apparatus 300 may be configured, using one or more of the modules to execute the operations described herein. The components 302-308 may function similar or identical to the similarly named components depicted and described above with respect to apparatus 200. For purposes of brevity, repeated disclosure with regard to the functionality of such similarly named components is omitted.

The group-based client module 310 includes hardware, software, firmware, and/or a combination thereof, configured to support functionality associated with accessing and utilizing a group-based communication system. In this regard, in some embodiments, the group-based client module 310 is configured to enable a user to initiate an authenticated session associated with an authenticated user account, for example by inputting user authentication credentials for authenticating via a group-based communication system. Additionally or alternatively, in some embodiments, the group-based client module 310 is configured to transmit one or more requests for identifying channel information for manageable group-based communication channels and/or to transmit one or more requests for performing one or more actions for managing the group-based communication channels. In some embodiments, the group-based client module 310 additionally or alternatively includes software, hardware, firmware, or a combination thereof, for receiving one or more response(s) to the one or more transmitted request(s), and/or processing the received responses. It should be appreciated that, in some embodiments, the group-based client module 310 may include a separate processor, specially configured FPGA, or a specially configured ASIC.

In some embodiments, one or more of the aforementioned components of apparatus 300 is combined to form a single module. For example, in some embodiments, the group-based client module 310 is combined with one or more other modules into a single module, for example in combination with processor 302. The combined module may be configured to perform some or all of the functionality described above with respect to the individual modules. Additionally or alternatively, in some embodiments, one or more of the modules described above may be configured to perform one or more of the actions described with respect to one or more of the other modules.

Example Group-Based Computing Environment

FIGS. 4A and 4B depict an example computing environment representing aspects of a group-based communication system, in accordance with at least one example embodiment of the present disclosure. The example computing environment includes a plurality of entities managed within the computing environment, specifically organizations, workspaces, channels, and message sets, arranged according to an entity hierarchy. Specifically, the example computing environment includes an organization 402, group-based workspaces 404A-404D (collectively "workspaces 404"), group-based communication channels 406A-406C (collectively "channels 406"), group-based communication channels 408A-408B (collectively "channels 408"), group-based communication channel 410, and group-based communication channels 412A-412B (collectively "channels 412"), and message sets 414A-414F (collectively "message sets 414"). In some embodiments, the computing environment may be maintained via hardware, software, firmware, or a combination thereof, of one or more computing systems, for example a group-based communication system embodied by the apparatus 200.

Within an example computing environment, an organization may be associated with any number of workspaces. For example as illustrated, the organization 402 is associated with each of the workspaces 404. In some embodiments, the workspaces 404 are separated based on intended user groups and/or use cases. As such, in some embodiments, each of the workspaces 404 is associated with permission data configured to enable certain authenticated user accounts to access each workspace. In this manner, the computing environment provides requisite security measures to ensure that only allowed user authenticated user accounts may access each of the workspaces 404.

Further, in at least some embodiments, each of the workspaces may be associated with any number of channels. For example as illustrated, workspace 404A is associated with, and/or otherwise includes channels 406, workspace 404B includes channels 408, workspace 404C includes channel 410, and workspace 404D includes channels 412. The channels may each be configured to embody a group-based communication channel having any channel type, for example may be a private group-based communication channel or a public group-based communication channel. Additionally or alternatively, each channel may be configurable as a common group-based communication channel to be shared with another entity, for example shared with another organization via another workspace or with another workspace maintained by the same organization 402. Further, in some embodiments, one or more group-based communication channels is configurable such that only a subset of the authenticated user accounts permissioned for accessing the channel are further permissioned to access the channel. It should be appreciated that in some contexts, a workspace may include a plurality of channels of a certain channel type. For example, channel 406A and channel 406C may each embody public group-based communication channels, while channel 406 may embody a private group-based communication channel. Any of such group-based communication channels may be shared for configuring as a common group-based communication channel with at least one other entity.

Further, in at least some embodiments, each of the channels is associated with a group-based communication message set. The group-based communication message set may include group-based communication messages posted to the channel by authenticated user accounts having access to the channel, and/or external resources associated with the channel. For example, the message set 414A corresponds to any number of group-based communication messages posted within channel 406A. Similarly, message set 414B corresponds to any number of group-based communication messages posted within channel 406B, and so on. Group-based communication messages may be posted by users using one or more client devices, for example to be stored and transmitted to one or more other user devices associated with other authenticated user accounts accessing the group-based communication channel. In this regard, a user may select a group-based communication channel, for example within a group-based communication interface, to enable posting of the group-based communication message to the selected group-based communication channel. Additionally or alternatively, an external resource may transmit a group-based communication message in response to user request, for example embodied by another group-based communication message within the group-based communication channel, or automatically, for example in response to one or more events determined by the external resource or an associated external system. In some embodiments, an external resource is configured to communicate with a group-based communication system via one or more APIs.

FIG. 4B illustrates a hierarchy of user accounts associated with an organization, in accordance with at least one embodiment of the present disclosure. As illustrated, an organization may be associated with, or otherwise "include," any number of user accounts. The user accounts may each be associated with any number of users, for example in at least one context each user account is associated with one user, in other contexts a user account is associated with any number of users and/or each user is associated with any number of user accounts. As illustrated, the organization 402 is associated with authenticated u4ser accounts 450A-450N (collectively "authenticated user accounts 450"). In at least some embodiments, each of the authenticated user accounts 450 is associated with different administrator permission data, for example such that the functionality available to each of the authenticated user accounts 450 differs with respect to managing various group-based communication channels, and/or other entities, associated with the organization 402. As illustrated for example, the user account 450A and the user account 450B each embody an administrator user account for the organization 402. In this regard, the administrator user accounts may each be permissioned for managing data associated with the organization 402, and/or other entities associated therewith. For example in at least some embodiments, each of the administrator user accounts 450A and 450B are permissioned for managing any of the group-based communication channels for group-based workspaces associated with the organization 402. With respect to the entities depicted in FIG. 4A, for example, the administrator user accounts 450A and 450B may each be configured to manage settings, data, and/or other information associated with each of the channels 406, 408, 410, and/or 412, and/or to manage the message sets 414 associated with any of such channels.

Additionally or alternatively, the administrator user accounts 450A and 450B may each designate one or more other user accounts as administrator user accounts with respect to the organization 402, and/or one or more sub-entities associated with the organization 402. It should be appreciated that, in some embodiments, any authenticated user account may be designated as an administrator user account for one or more entities, and that different authenticated user accounts may be designated as authenticated user accounts with respect to various sub-entities associated with the organization 402. In this regard, the user accounts designated as administrator user accounts for one or more entities may be associated with permission data indicating the user account may manage the one or more entities. Additionally or alternatively, in some embodiments, the group-based communication system is configured to enable an administrator user account for a particular entity to designate one or more other authenticated user accounts having access to the entity as administrator user account(s) for the entity and/or sub-entities thereof.

In at least one example context, the administrator user account 450A may designate the authenticated user account 450D as an administrator of workspace 404A, for example causing storing of permission data indicating the authenticated user account 450D is permissioned to manage data associated with the workspace 404A and/or the sub-entities thereof including the channel set 406 and/or message sets 414A-414C. In this regard, the group-based communication system may be configured to determine, based on the permission data, that the workspace 404A and sub-entities thereof are the each manageable by the authenticated user account 450D. In some such embodiments, managing a workspace may include altering one or more settings and/or parameter values associated with the workspace, deleting sub-entities thereof (e.g., deleting a channel from the channel set 406), and/or adding a sub-entity (e.g., adding a channel to the channel set 406).

Additionally or alternatively, the administrator user account 450 may designate the authenticated user account 450D as an administrator of a group-based communication channel, for example of group-based communication channel 408A. In this regard, the authenticated user account 450D may be associated with permission data indicating the authenticated user account 450D is permissioned to manage data associated with the channel 408A and/or sub-entities thereof including the message set 414D. In such contexts, the authenticated user account 450D is permissioned to manage the channel 408A, but is not permissioned for managing sister-entities (such as the channel 408B and/or other group-based communication channels in the channel set 408) or any higher-level entities such as the workspace 404B. In this regard, the group-based communication system may be configured to determine, based on the permission data, that the channel 408A and sub-entities thereof are the only entities manageable by the authenticated user account 450D.

Example Centralized Channel Management Information and Interfaces

FIGS. 5A, 5B, 5C, 6A, 6B, and 7-8 illustrate example user interfaces including various information and enabling various functionality for centralized channel management, in accordance with at least one example embodiment of the present disclosure. It should be appreciated that the information depicted in the various user data is exemplary, and that similar and/or alternative data, parameters, data values, and/or the like may be provided. Additionally or alternatively, in some embodiments, the layout of the various interface elements, and/or sub-interfaces of each depicted user interface may differ without deviating from scope of this disclosure. Further, it should be appreciated that, in some embodiments, data and/or information for centralized channel management may be provided without one or more corresponding user interfaces, for example via one or more APIs made available via a group-based communication system. As such, the example depicted interfaces, sub-interfaces, elements, and data values depicted therein are provided for descriptive and illustrate purposes and are not to limit the scope or spirit of the disclosure herein.

FIG. 5A illustrates an example centralized channel management dashboard 500 ("dashboard 500"), in accordance with at least one example embodiment of the present disclosure. The dashboard 500 may be rendered to a client device associated with an authenticated user account, for example, during an authenticated session. In some embodiments, a group-based communication system causes rendering of the dashboard 500 via the client device, for example by transmitting data to be used in configuring and/or populating the dashboard 500, and/or transmitting data embodying the dashboard 500, to the client device. In some embodiments, the group-based communication system causes rendering of the dashboard 500 to the client device in response to one or more requests to access the dashboard transmitted from the client device to the group-based communication system.

As illustrated, the dashboard 500 includes a plurality of data columns representing different channel data values for a plurality of group-based communication channels. Specifically, the dashboard 500 includes data associated with a manageable group-based communication channel set 504. The manageable group-based communication channel set 504 may be associated with a particular authenticated user account, for example such that the authenticated user account is permissioned to manage each channel in the manageable group-based communication channel set 504. In this regard, the authenticated user account may be associated with permission data for one or more channel(s) in the manageable group-based communication channel set 504, and/or with one or more higher-level entities (e.g., a workspace or organization) associated with one or more channel(s) in the manageable group-based communication channel set. In this regard, it should be appreciated that in at least some such embodiments, the dashboard 500 is customized based on information identified as manageable by the authenticated user account accessing the dashboard 500.

The dashboard 500 includes information associated with a number of group-based communication channels manageable by a particular authenticated user account, specifically identified as manageable group-based communication channel set 504. The manageable group-based communication channel set 504 may include any number of group-based communication channels of various types. For example, in some embodiments, an authenticated user account is permissioned for managing a group-based communication channel and/or managing access to the group-based communication channel directly, or indirectly based on permission data for one or more higher-level entities. Additionally or alternatively, in some embodiments, an authenticated user account may be associated with permission data for managing a group-based communication channel for which the authenticated user account is not a member (e.g., an inaccessible group-based communication channel). For example, an administrator user account with respect to a group-based communication channel may delegate permission data for managing a private group-based communication channel to another authenticated user account that has not joined the private group-based communication channel. In this regard, it should be appreciated that an authenticated user account does not need to be a member of an entity to be permissioned for managing the entity (e.g., an authenticated user account may manage an organization, workspace, and/or channel inaccessible to the authenticated user account). In some such embodiments, the dashboard 500 nevertheless includes one or more inaccessible group-based communication channel(s) in the manageable group-based communication channel set 504. For example, in this regard, a particular authenticated user account may be permissioned for managing one or more workspace(s) and/or group-based communication channels(s), for example, that the user is not permissioned to access, for example for purposes of posting new messages, receiving messages, and/or otherwise interacting within the entity.

Each row of the manageable group-based communication channel set 504 comprises data values for various parameters of a group-based communication channel, and/or associated with the group-based communication channel, manageable by the authenticated user account. Each data column may include a data value associated with a parameter for the channel. It should be appreciated that the dashboard 500 may be configured to include any parameter of and/or associated with a group-based communication channel, and such parameters are not limited to the exemplary parameters depicted in FIG. 5. In an example context, as illustrated, channel name column 504A includes a data value for a parameter representing a channel name for a group-based communication channel. In this regard, in at least some embodiments, interaction with the channel name column 504A may cause the dashboard 500 and/or an associated interface to be rendered for viewing and/or altering the data value representing the name of the group-based communication channel associated with the row. Additionally or alternatively, as illustrated, workspace sharing column 504B includes a data value for a parameter representing the number of workspaces with which a channel is shared. In this regard, interaction with the workspace sharing column 504B may cause the dashboard 500 and/or an associated interface to be rendered with data for some or all of the workspaces with which the channel is shared, and/or may enable adjustment of the workspaces with which the channel is shared (e.g., to share the channel in another workspace, or to remove sharing from an existing workspace). Additionally or alternatively, as illustrated, external sharing column 504C includes data values for a parameter representing any third-party organizations with which the channel is shared. In this regard, the external sharing column 504C may include an identifier and/or other information associated with each third-party organization (other than the owner organization) with which the channel has been shared. Accordingly, a channel having data values indicating the channel was shared with at least one third-party organization may embody a common group-based communication channel for communicating between one or more authenticated user accounts for each organization. Additionally or alternatively, as illustrated, the member user column 504D includes a data value for a parameter representing the number of authenticated user accounts having access to the channel. The data value may represent the number of authenticated user accounts having access to the channel from any workspace and/or associated with any organization (including one or more third-party organizations in a circumstance where the channel is shared). It should be appreciated that a centralized channel management dashboard, for example the dashboard 500, may be configured to include any of various types of information. For example, in at least some example embodiments, the dashboard may be configured to include one or more of channel creation timestamp data, channel creator account data, historical activity data, channel share status data, channel guest status data, and/or any combination thereof.

In some embodiments, user interaction with one or more of the rows of the manageable group-based communication channel set 504 causes rendering of another interface, or sub-interface, based on the corresponding group-based communication channel of the manageable group-based communication channel set 504. For example, in at least one example context, user interaction may cause rendering of a member list for the group-based communication channel (e.g., all authenticated user accounts and/or guest user accounts). In yet other embodiments, user interaction causes rendering of another interface, or sub-interface, providing more information based on the data value with which the user interaction occurred. For example, in a circumstance where the user interacts with a data value of the workspace sharing column 504B, an interface and/or sub-interface may be rendered that includes information associated with the workspaces having access to the group-based communication channel (e.g., names of such workspaces, and/or the like). For example, in some such embodiments, one or more of the interfaces described below with respect to FIGS. 5B, 5C, 6A and/or 6B are accessed in response to such user interaction.

Additionally or alternatively, in some embodiments, the rows associated with the manageable group-based communication channel set 504 may be sorted within the dashboard 500. For example, in at least some embodiments, a sub-interface associated with the data columns 504A-504D is configured to receive user interaction indicating a desire to sort the rows based on the data column. It should be appreciated that the rows may be sorted in any of a myriad of manners for one or more data columns (e.g., alphabetically, reverse-alphabetically, descending order, ascending order, and/or the like).

It should be appreciated that the manageable group-based communication channel set 504 may include any number of group-based communication channels manageable by the authenticated user account. Accordingly, the dashboard 500 may include any number of rows corresponding to the channels in the manageable group-based communication channel set 504. The dashboard 500 further include channel filtering element 508. The channel filtering element 508 may enable selection of one or more channel parameter values to limit the rendered rows of the dashboard 500 to include only the channels of the manageable group-based communication channel set 504 that meet the selected channel parameter values, or alternatively do not meet one or more of the selected channel parameter values. For example, the channel parameter values may include values for a channel type, whether the channel is shared between one or more workspaces, whether the channel is shared with one or more third-party organizations, and/or the like.

Additionally or alternatively, the dashboard 500 may include channel search element 506 for limiting the rendered rows of the dashboard 500 to include only the channels matching the value input into the channel search element 506. In this regard, the dashboard 500 may be rendered to include the one or more parameter values that include the value input to the channel search element 506. It should be appreciated that in some embodiments filtering the dashboard 500 via the channel search element 506 and the channel filtering element 508 may be combined.

Further, as illustrated, the dashboard 500 includes channel selection elements 510, each channel selection element of the channel selection elements 510 associated with a row representing a group-based communication channel of the manageable group-based communication channel set 504. In this regard, interaction with a channel selection element of the channel selection elements 510 may select the row and corresponding channel, for example to perform one or more channel management actions. As such, interaction with a subset of the channel selection elements 510 enables selection of a subset of the manageable group-based communication channel set 504 such that a single channel management action may be performed for the subset of channels in the manageable group-based communication channel set 504. Accordingly, a user may interact with the channel selection elements for selecting a particular desired subset of group-based communication channels for managing. In some embodiments, for example as illustrated, the channel selection elements 510 includes at least one channel selection element specially configuring for selecting, and/or deselecting, all channels associated with a row currently rendered via the dashboard 500. In this regard, the user may interact with the channel selection elements 510 to select a desired subset of the manageable group-based communication channel set 504 to be managed together according to one or more user-initiated channel management actions.

Additionally or alternatively, as illustrated, the dashboard 500 may include a dashboard navigation sub-interface 502. The dashboard navigation sub-interface 502 may include one or more interface elements configured to receive user interaction, and subsequently alter the information rendered to the dashboard 500 based on the user interaction, and/or cause rendering of one or more associated interfaces for accessing such associated interfaces. For example, in some embodiments, the dashboard navigation sub-interface 502 is configured to include one or more interface elements for each workspace of an organization with which the authenticated user account is associated. Additionally or alternatively still, the dashboard navigation sub-interface 502 may include interface elements for selecting a specific subset of the manageable group-based communication channel set 504 to be rendered via the dashboard 500.

In some embodiments, the dashboard navigation sub-interface 502 may include one or more interface elements configured to enable access to one or more interfaces providing functionality for altering data associated with organization-level channel management. In this regard, FIG. 5B illustrates an example dashboard sub-interface for altering permission data associated with organization-level channel management in accordance with at least some example embodiments of the present disclosure. For example, as illustrated, the dashboard navigation sub-interface 502 includes an interface element (such as a button) titled "channel administration" for accessing the organization-level channel management interface 520.

The organization-level channel management interface 520 may include any number of interface elements for providing functionality associated with setting organization defaults for managing sub-entities associated thereof. It should be appreciated that, in some embodiments, the organization-level channel management interface 520 includes any of a myriad of interface elements associated with setting management permissions for any number of such sub-entities.

As illustrated, for example the organization-level channel management interface 520 includes a public channel permission interface 522 associated with a particular organization. In this regard, the public channel permission interface 522 may provide functionality for setting permission data associated with managing public group-based communication channels associated with the organization (for example, public group-based communication channels designated a default group-based communication channel for inclusion in all workspaces associated with the organization, and/or public group-based communication channels in any workspace associated with the organization). As illustrated, the associated permission data indicates only the organization primary owners are permissioned for managing public group-based communication channels for the organization. The public channel permission interface 522 further includes at least one interface element for editing the associated permission data, for example via one or more further interfaces for selecting one or more authenticated user accounts, or groups of authenticated user accounts (e.g., "organization primary owners") permissioned for managing the public group-based communication channel(s).

FIG. 5C illustrates an example interface for editing permission data associated with group-based communication channel management, specifically for editing permission data associated with managing group-based communication channels of a particular organization, in accordance with at least some embodiments of the present disclosure. In this regard, FIG. 5C depicts an example permission editing interface 550. The permission editing interface 550 may include one or more interface elements for editing permission data associated with managing public group-based communication channel(s) for an organization.

As illustrated, the permission editing interface 550 includes a user role selection interface 552. The user role selection interface may include one or more user roles for an authenticated user account. In this regard, each of the of the user roles may correspond to a different level of administrative permissions associated with the organization. In this regard, a "primary owner" may be associated with an authenticated user account for a top administrator in the organization. Similarly, "organization owner" may be delegated from the primary owner and/or otherwise preconfigured for one or more administrator authenticated user accounts associated with the organization. Admin authenticated user accounts associated with the role of "organization owner" may be associated with the same permissions as the "primary owner," however in some embodiments are not configured to alter the permissions of at least the primary owner. Further, "admin" may be delegated from the primary owner and/or other organization owners, and may be associated with less permissions than the primary owner and/or organization owners, and/or the same permissions, but are not configured to alter the management permissions for the organization owners and/or primary owner. It should be appreciated that selecting one of the user roles, for example via one or more interface elements associated with each role (such as the radio buttons as depicted), corresponds to a set of authenticated user accounts associated with the selected user role. In this regard, the associated set of authenticated user accounts are to be permissioned for managing the associated group-based communication channels (such as public group-based communication channels) upon submitting the selections via one or more interface elements (such as the "save" button as depicted).

The permission editing interface 550 further includes a user selection interface 554. The user selection interface 554 includes one or more interface elements for adding particular authenticated user account(s) to be permissioned for managing the associated group-based communication channels (such as public group-based communication channels as illustrated). In this regard, a user may input and/or select one or more authenticated user accounts, for example from a determined set of all authenticated user accounts associated with the organization, for permissioning. Upon submitting changes associated with the interface 550, for example via the "save" button as depicted, the authenticated user accounts specifically identified via the user selection interface 554 may additionally or alternatively be permissioned for managing the associated group-based communication channels (for example, public group-based communication channels as depicted). It should be appreciated that any number of authenticated user accounts may be selected via the user selection interface 554.

Additionally or alternatively, as illustrated, for example the organization-level channel management interface 520 includes a private channel permission interface 524 associated with a particular organization. In this regard, the private channel permission interface element 524 may provide functionality for setting permission data associated with managing private group-based communication channels associated with the organization (for example, private group-based communication channels configured as a default group-based communication channel for includes in all workspaces associated with the organization, and/or private group-based communication channels in any workspace associated with the organization). As illustrated, the associated permission data indicates only the organization primary owners are permissioned for managing private group-based communication channels for the organization. The private channel permission interface 524 further includes at least one interface element for editing the associated permission data, for example via one or more further interfaces for selecting one or more authenticated user accounts, or groups of authenticated user accounts (e.g., "organization primary owners") permissioned for managing the private group-based communication channel(s). It should be appreciated that, in at least some embodiments, the interface element enables access to an interface similar or equivalent to that of permission editing interface 550 for setting permission data associated with private group-based communication channels.

Additionally or alternatively, as illustrated, for example the organization-level channel management interface 520 includes multi-workspace channel permission interface 526 associated with a particular organization. In this regard, the multi-workspace channel permission interface 526 may provide functionality for setting permission data associated with managing group-based communication channels accessible by a plurality of workspaces associated with the owner organization, and/or in some embodiments group-based communication channels accessible by at least one workspace associated with a third-party organization associated with the organization (for example, a group-based communication channel that the owner organization has shared). As illustrated, the associated permission data indicates that all non-guest authenticated user accounts are permissioned for creating, editing, and/or archiving group-based communication channels accessible within a plurality of workspaces. The multi-workspace channel permission interface 526 further includes at least one interface element for editing the associated permission data, for example via one or more further interfaces for selecting one or more authenticated user accounts, or groups of authenticated user accounts (e.g., "organization primary owners") permissioned for managing group-based communication channel(s) accessible within a plurality of workspaces. It should be appreciated that, in at least some embodiments, the interface element enables access to an interface similar or equivalent to that of permission editing interface 550 for setting permission data associated with multi-workspace group-based communication channels.

Additionally or alternatively, as illustrated, for example the organization-level channel management interface 520 includes a shared channel request permission interface 528 associated with a particular organization. In this regard, the shared channel request permission interface 528 may provide functionality for setting permission data associated with enabling authenticated user accounts to submit requests to share a group-based communication channel, and/or permission data associated with enabling approval and/or rejection of submitted requests to share a group-based communication channel. As illustrated, the associated permission data indicates that shared channel request(s) may be submitted and only the organization primary owners and organization admins (e.g., delegated administrator authenticated user accounts associated with the organization) are permissioned for approving and/or rejecting the shared channel request. The shared channel request permission interface 528 further includes at least one interface element for editing the associated permission data, for example via one or more further interfaces for selecting one or more authenticated user accounts, or groups of authenticated user accounts (e.g., "organization primary owners" and/or "organization administrators," and/or a combination thereof) permissioned for approving and/or rejecting shared channel requests in circumstances where such requests are enabled. It should be appreciated that, in at least some embodiments, the interface element enables access to an interface similar or equivalent to that of permission editing interface 550 for setting permission data associated with shared channel requesting and/or approval.

In some embodiments, one or more additional interface elements are provided that enable organization-level channel management. For example, in at least one embodiment, one or more interface elements are provided for editing management permission for which authenticated user accounts are permissioned to invite to private group-based communication channels, and separate one or more interfaces for editing management permission for which authenticated user accounts are permissioned for setting group-based communication channels as private and/or public. In this regard, it should be appreciated that an organization may be associated with various permission data associated with various functionality to be performed via the group-based communication system. Similarly, it should be appreciated that each such permission data may be associated with one or more separate sets of interface element(s) such that permission data may be set to one or more desired values individually. Alternatively or additionally, in some embodiments, one or more portions of permission data may correspond to a plurality of functionality, for example where a single setting corresponds to permission to invite to a private group-based communication channel and set a group-based communication channel as either private or public.

Additionally or alternatively, as illustrated, the organization-level channel management interface 520 may include one or more additional interface elements for configuring one or more group-based communication channels as a default group-based communication channel for the organization. In this regard, in at least one example embodiment, each default group-based communication channels may be accessible from within each workspace associated with the organization. In this regard, the organization-level channel management interface 520 may include an interface element associated with each group-based communication channel currently configured as a default group-based communication channel, and/or one or more interface elements for editing such configurations and/or configuring the group-based communication channel to remove it as a default group-based communication channel. Additionally or alternatively still, the organization-level channel management interface 520 may include an interface element associated with configuring one or more group-based communication channel(s) as a default group-based communication channel, for example where such group-based communication channel(s) are currently not configured as a default group-based communication channel for the organization.

FIG. 6A illustrates an example interface of a centralized channel management dashboard 600 ("interface 600"), in accordance with at least one example embodiment of the present disclosure. In at least one embodiment, the interface 600 embodies a centralized channel management dashboard, or sub-interface thereof, for example to enable initiation of one or more channel management action(s) associated with at least one channel. In this regard, the interface 600 may enable initiation of a channel management action for one selected channel (e.g., based on the interface element interacted with by the user) or for a plurality of selected channels (e.g., based on interaction with one or more channel selection elements of a dashboard).

The interface 600 includes channel management interface element 602. In some embodiments, a channel management interface element 602 is rendered for each row within the interface 600 associated with a manageable group-based communication channel. In this regard, interaction with the channel management interface element 602 may be associated with accessing interface elements for initiating channel management actions performable for the corresponding group-based communication channel. In this regard, interaction with the channel management interface element 602 may cause rendering of a management action options interface 604. The management action options interface 604 includes a set of interface elements, each associated with initiating a different channel management action for at least the channel associated with the channel management interface element 602 with which the user interacted. As illustrated, the management action options interface 604 includes a first interface element for managing members of the channel, a second interface element for managing settings for the channel, and a third interface element for archiving the channel. It should be appreciated that, in some embodiments, user interaction with one or more of the interface elements of the management action options interface 604 causes initiation of then associated channel management actions via the group-based communication system.

Additionally or alternatively, in some embodiments, the management action options interface 604 is configured to initiate one or more channel management actions for a selected set of channels. For example, interaction with the an interface element of the management action options interface 604 may initiate the channel management action for each of the selected group-based communication interfaces. In this regard, the selected group-based communication channels may be managed with reduced interactions, such that each group-based communication channel is not required to be managed individually.

FIG. 6B illustrates an example interface for centralized channel management, specifically for channel member management, in accordance with at least one example embodiment of the present disclosure. Specifically, FIG. 6B depicts channel member management interface 650. The channel member management interface 650 includes a plurality of information associated with a selected channel, for example the channel "#engineering" as illustrated. In some embodiments, the channel member management interface 650 is accessed based on user interaction with one or more elements of the dashboard 500, and/or interface 600, such as user interaction with an interface element associated rendered to the dashboard associated with a selected group-based communication channel. For example, in at least one context, the channel member management interface 650 is accessed in response to user interaction with the #engineering interface element rendered to the dashboard 500, or a corresponding channel management interface element 602 as depicted and described with respect to FIG. 6A. Additionally or alternatively, the channel member management interface 650 may be accessed via the dashboard navigation sub-interface 502.

The channel member list 652 includes an interface element associated with each authenticated user account permissioned to access the selected group-based communication channel. In this regard, the channel member list 652 may include one or more associated data values for the authenticated user account, such as an associated account name, and/or account email and/or identifier. Additionally or alternatively, in at least some embodiments, the channel member list 652 includes an element indicating whether the authenticated user account is associated with full access permissions, and/or limited access permissions (e.g., as a guest account, and/or an authenticated user account associated with a third-party organization). Additionally or alternatively still, in at least some embodiments, each authenticated user account is associated with one or more interface elements for editing the access and/or management permission data associated with the authenticated user account. For example, a button may be provided together with each authenticated user account to remove access permissions for the authenticated user account, limiting access permissions for the authenticated user account, granting access permissions for the authenticated user account, and/or the like. In some embodiments, the channel member list 652 is determined based on all authenticated user accounts for one or more workspaces (for example, in the circumstance where the channel is public) and/or a configured authenticated account data set indicating authenticated user accounts associated with the group-based communication channel, the authenticated account data set indicating authenticated user account(s) that were invited, and accepted, access to the selected group-based communication channel and/or otherwise permissioned for accessing the selected group-based communication channel (for example, in a circumstance where the channel is private). In some embodiments, the channel member management interface 650 includes one or more sorting, searching, and/or filtering interface elements for altering the authenticated user accounts rendered to the channel member list 652 based on any data parameter embodying the authenticated user account (e.g., identifier, name, display name, alternative name, email, role, and/or the like).

The channel member management interface 650 further includes member adding element 654. In some embodiments, the member adding element 654 enables access to one or more interfaces, and/or sub-interfaces, for permissioning an authenticated user account to access the selected group-based communication channel (as illustrated, #engineering). In some such embodiments, user interaction with the member adding element 654 provides one or more user selection interfaces for inputting an authenticated user account associated with an organization and/or workspace having access to the selected group-based communication channel. In this regard, the authenticated user account may be selected from the authenticated user accounts associated with a higher-level entity than the selected group-based communication channel.

As illustrated, the channel member management interface 650 further includes an accessible workspace list 656. The accessible workspace list includes an interface element associated with each workspace with which the selected group-based communication channel is shared. In this regard, the selected group-based communication channel may be accessible from within each workspace identified in the accessible workspace list 656, as well as an owner workspace (such as the workspace within which the selected group-based communication channel was originally created). In some embodiments, the accessible workspace list 656 includes information associated with each workspace of the owner organization with which the selected group-based communication channel is shared, for example at least a workspace name (e.g., "Bold Croutons") and a workspace identifier (e.g., "boldcroutons.slack.com"). Additionally or alternatively, in at least some embodiments, the accessible workspace list 656 includes, or is otherwise associated with, one or more interface elements for managing the shared workspaces embodied in the accessible workspace list. For example, in some embodiments, an "edit" interface element is rendered that, in response to user interaction, causes rendering of an interface and/or sub-interface including one or more interface elements for generating and storing, via a group-based communication system, data enabling access to the group-based communication channel within an existing workspace (such as data representing the workspace has been shared), and/or deleting data enabling access from a workspace with which the selected group-based communication channel was shared. In this regard, such an interface and/or sub-interface may include one or more interface elements for searching, filtering, and/or sorting workspaces that are associated with the owner organization for the selected group-based communication channel and with which the selected group-based communication channel may be shared. In some such embodiments, the "edit" interface element is rendered in a circumstance where the authenticated user account accessing the channel member management interface 650 is permissioned for managing workspace sharing for the selected group-based communication channel.

As illustrated, the channel member management interface 650 further includes a shared third-party organization list 658. The shared third-party organization list 658 includes an interface element associated with each third-party organization with which the selected group-based communication channel is shared. In this regard, the selected group-based communication channel may be accessible by one or more authenticated user accounts associated with each organization represented in the shared third-party organization list 658. In some embodiments, the shared third-party organization list 658 includes information associated with each organization represented in the shared third-party organization list 658, for example at least an organization name (e.g., "Bread Consulting"), and/or organization identifier, and an organization member count (e.g., 4 authenticated user accounts associated with the third-party organization). In some embodiments, an "edit" interface element is rendered that, in response to user interaction, causes rendering of an interface and/or sub-interface including one or more interface elements for generating and/or storing, via a group-based communication system, data enabling access to the group-based communication channel by one or more authenticated user accounts associated with a third-party organization, for example from within one or more associated workspace(s), and/or for deleting data enabling access to the group-based communication channel for one or more authenticated user accounts associated with a third-party organization (e.g., terminating the sharing of the selected group-based communication channel with the third-party organization). In some such embodiments, the "edit" interface element is rendered in a circumstance where the authenticated user account accessing the channel member management interface 650 is permissioned for managing organization sharing for the selected group-based communication channel.

As illustrated, the channel member management interface 650 further includes a posting permission interface element 660. The posting permission interface element 660 includes information indicating user groups, roles, and/or the like, permissioned for posting within the selected group-based communication channel. For example, in an example context, all authenticated user accounts having access to the selected group-based communication channel are permissioned to post group-based communication messages to the selected group-based communication channel. In other contexts, only authenticated user accounts associated with one or more user roles (e.g., only administrator user accounts for the authenticated user accounts, channel owner authenticated user accounts, and/or the like), authenticated user accounts associated with a subset of the shared workspaces (for example, where authenticated user accounts associated with only certain workspaces are permissioned for posting group-based communication messages to the selected channel), and/or authenticated user accounts associated with a subset of shared organizations (for example, where authenticated user account(s) associated with one or more third-party organizations are permissioned for access and viewing but not for posting group-based communication messages to the selected channel). In some embodiments, an "edit" interface element is rendered that in response to user interaction, causes rendering of an interface and/or sub-interface including one or more interface elements for editing permission data associated with posting to the selected group-based communication channel. For example, in some such embodiments, one or more interface elements may be provided for inputting one or more authenticated user accounts to be permissioned for posting to the selected group-based communication channel, one or more user roles to be permissioned for posting to the selected group-based communication channel, adding data representing one or more workspaces to permission for posting, deleting data for one or more workspaces not permissioned for posting, adding data representing one or more organizations permissioned for posting, and/or deleting data representing one or more organizations permissioned for posting, and/or the like. In some such embodiments, the "edit" interface element is rendered in a circumstance where the authenticated user account accessing the channel member management interface 650 is permissioned for managing posting permissions for the selected group-based communication channel.

FIG. 7 illustrates an example channel access permissioning interface 700 ("interface 700") for managing access to one or more channel(s), in accordance with at least one example embodiment of the present disclosure. In some embodiments, the interface 700 is rendered in response to user interaction with one or more interface elements for initiating a channel management action for one or more selected channels. The channel access permissioning interface 700 is configured to enable removing permission associated with one or more authenticated user account(s) from accessing the associated channel(s), and/or granting permission to one or more authenticated user accounts for accessing the associated channel(s). In at least one embodiment, the interface 700 is configured for rendering in a group-based communication interface and/or as a modal interface associated with a group-based communication interface.

The interface 700 includes a channel access parameter element 702. The channel access parameter element 702 is configured for selecting a parameter value representing access to one or more associated channels. For example, in some such embodiments, each parameter value may define a different predefined methodology for providing permission data for accessing the one or more group-based communication channels. Non-limiting examples of parameter values for providing permission data for accessing the one or more group-based communication channel(s) include channel creator (or in other words an owner) only, channel creator and administrator user accounts, and/or channel creator, administrator user accounts, and/or one or more designated user accounts.

In some such embodiments, additionally or alternatively, the interface 700 includes the designated user selection element 704. In some embodiments, a user may interact with the designated user selection element 704 to provide input for adding one or more authenticated user account(s) to be permissioned for accessing the associated group-based communication channel(s) and/or remove permission for accessing the associated group-based communication channel(s). In this regard, the designated user selection element 704 may include authenticated user account identifier(s), and/or associated information such as a name associated with the authenticated user account, to be permissioned for accessing the group-based communication channel(s). Accordingly, the designated user selection element 704 may include a sub-interface for each authenticated user account permissioned to access the group-based communication channel(s). In some such embodiments, interaction with the designated user selection element 704 and/or the sub-interface thereof associated with a particular authenticated user account, enables removal of permission data for the authenticated user account with respect to the group-based communication channel(s) upon submission.

As illustrated, the interface 700 further includes an interface cancel element 706. The interface cancel element 706 may be configured to receive user interaction representing cancellation of managing the group-based communication channel(s) via the interface 700. In this regard, interaction with the interface cancel element 706 may cause rendering of a centralized channel management dashboard 500 without storing data for permanently effecting changes made via the interface 700. Further as illustrated, the interface 700 further includes an interface submission element 708. The interface submission element 708 may be configured to receive user interaction representing saving of the values input via the interface 700. In this regard, interaction with the interface submission element 708 may initiate one or more processes to cause storage of the input values in a group-based communication system, for example to store permission data only associated with authenticated user accounts indicated as having permission for accessing and/or managing the one or more identified group-based communication channels. In some such embodiments, interaction with the interface submission element 708 causes transmission of data representing input via the interface 700 to a group-based communication system for processing and/or storing. In some embodiments, upon determining the input values have been successfully stored via a group-based communication system (for example, based on a response transmission from the group-based communication system), a centralized channel management dashboard 500 is again rendered via the client device to enable initiation of subsequent channel management actions for one or more manageable group-based communication channels.

In at least some embodiments, a group-based communication interface may be configured to include a sub-interface to convey, via one or more interface elements, channel information for one or more group-based communication channels. In at least some embodiments, such channel information includes permission data regarding access to and/or management of the one or more group-based communication channels. In this regard, FIG. 8 illustrates an example channel information interface 800 ("interface 800") that notifies a user of which organizations (or other user groups, for example associated with another workspace) have access to a group-based communication channel, in accordance with at least one example embodiment of the present disclosure. In the at least one embodiment, the interface 800 is configured to include one or more sub-interfaces for conveying such channel information for one or more group-based communication channels.

As illustrated, the channel information interface 800 includes a channel privacy notification element 802. In some embodiments, the channel privacy notification element 802 is configured to include data representing one or more entities, and/or authenticated user accounts associated therewith, permissioned to access a group-based communication channel. In this regard, a group-based communication system may identify such entities based on channel information associated with the group-based communication channel(s). For example, in at least one embodiment, the group-based communication system may be configured to identify one or more third-party organization identifiers and/or workspace identifiers with which the group-based communication channel is shared, and provide such information to a client device for rendering via an interface element, such as the channel privacy notification element 802.

In this regard, the channel privacy notification element 802 may be processed, and/or analyzed, to identify desired changes in access to the one or more group-based communication channels. In some embodiments, the interface 800 includes one or more additional interface elements for accessing functionality for managing at least the group-based communication. For example, as illustrated, the interface 800 includes channel management interface transition element 804. In some embodiments, the channel management interface transition element 804 is configured to initiate rendering of a centralized channel management dashboard for viewing and/or managing channel information for at least the group-based communication channel(s) associated with the interface 800. Accordingly, in some such embodiments, a user may interact with the channel management interface transition element 804 to transmit one or more requests to a group-based communication system configured such that the group-based communication system causes rendering of a centralized channel management dashboard, for example centralized channel management dashboard 500. In this regard, in at least some contexts, the interface 800 is configured to enable streamlined and efficient access to functionality for managing one or more selected group-based communication channel(s).

The channel information interface 800 may additionally or alternatively include elements associated with various other functionality for managing group-based communication channel access. For example, in at least one embodiment, the channel information interface 800 includes one or more interface elements for configuring a group-based communication channel as a private group-based communication channel and/or public group-based communication channel. In this regard, such interface elements may be interacted with to configure a corresponding setting to alter access permissions for one or more users accordingly, for example such that all authenticated user accounts of a particular workspace are permissioned for accessing the group-based communication channel if the group-based communication channel is set to a public group-based communication channel, and such that a limited set of authenticated user accounts of a particular workspace are permissioned for accessing the group-based communication channel if the group-based communication channel is set to a private group-based communication channel. Additionally or alternatively, for example in at least one embodiment, the channel information interface 800 includes one or more interface elements for sharing a group-based communication channel, for example the group-based communication channel, with one or more other workspaces associated with the organization owning the group-based communication channel. In at least one example context, the channel information interface 800 may provide a dropdown element for selecting from other workspaces with which to share the selected group-based communication channel. Additionally or alternatively, in at least one embodiment, the channel information interface 800 includes one or more interface elements for sharing the group-based communication channel with one or more third-party organizations (such as an organization other than the owner organization).

In some embodiments, the above-described functionality is provided via one or more APIs made available via the group-based communication system, for example embodied by the apparatus 200, which in some embodiments may further be accessed without use of one or more interface(s) through various requests. In this regard, the client device may request and/or receive data from a group-based communication system, and subsequently process the received data and/or perform further requests based on the received data without user interaction with any such interfaces, and/or without any user interaction at all. For example, in some embodiments, one or more requests may be performed automatically via communication with the group-based communication system utilizing one or more APIs, and/or the response data received from the group-based communication system may be automatically processed and one or more corresponding actions performed based on at least on the received data. Additionally or alternatively, in at least some embodiments, the data received via the one or more API requests is utilized in rendering one or more of the interfaces described above.

Example Operations for Centralized Channel Management

FIGS. 9-14 illustrate flowcharts depicting various example operations for processes and/or sub-processes for centralized channel management, in accordance with at least some example embodiments of the present disclosure. In at least some embodiments the described processes are performed via a group-based communication system, for example embodied by the apparatus 200 as depicted and described with respect to FIG. 2. In some embodiments, the apparatus 200 is in communication with one or more additional systems, devices, apparatuses, and/or the like, to enable one or more of the operations described herein. For example, in some embodiments, the apparatus is in communication with one or more external resource(s) and/or at least one client device, where the client device may be embodied by the specially configured apparatus 300 as depicted and described above with respect to FIG. 3. It should be appreciated that the apparatus 200 may be configured to communicate with the external resource(s) and/or client device(s) over one or more communication networks, such as the Internet.

As illustrated in the various flowcharts, optional blocks are depicted with dashed (or "broken") lines. It should be appreciated that, in at least some embodiments, one or more of the optional blocks is performed. Additionally or alternatively, in at least one embodiment, none of the optional blocks is performed. Additionally or alternatively still, in yet at least one other embodiment, all of the optional blocks are performed. It should also be appreciated that, in some embodiments, one or more blocks (whether indicated as optional or not) may be dropped from the embodiment processes as depicted and described. For example, with reference to FIG. 9 depicted and described herein, an example process may include at least blocks 902, 904, and 906, and may not include the blocks 908, 910, and/or 912. Alternatively in other embodiments, another example process may include at least blocks 908, 910, and/or 912, and may not include blocks 902, 904, and/or 906. In this regard, one or more sub-combinations of blocks may represent a process and/or subprocess performed by one or more embodiments intended to be covered by the disclosure provided herein.

FIG. 9 illustrates example operations for an example process for centralized channel management, in accordance with at least some example embodiments of the present disclosure. At optional block 902, the apparatus 200 includes means, such as the central channel management module 212, the group-based communication module 210, the communications module 208, the input/output module 206, the processor 202, and/or the like, or a combination thereof, configured to receive, from a client device, a centralized channel management request. In some embodiments, the centralized channel management request is associated with an authenticated user account identifier. The authenticated user account identifier uniquely identifies an authenticated user account accessing the apparatus 200, for example during an authenticated session. In this regard, the authenticated user account identifier may represent a unique identifier for use in identifying group-based communication channels permissioned for management by the authenticated user account accessing the apparatus 200. In some embodiments, the authenticated user account identifier is included in the centralized channel management request, such that the apparatus 200 may parse the authenticated user account identifier from the request. Additionally or alternatively, in at least some embodiments, the apparatus 200 is configured to identify the associated authenticated user account based on an authenticated session for the client device from which the request was received. For example, the apparatus 200 may be configured to validate the client device is associated with an existing authenticated session, and thus identify a particular authenticated user account associated with the authenticated session upon and/or during validation.

At optional block 904, the apparatus 200 includes means, such as the central channel management module 212, the group-based communication module 210, the communications module 208, the input/output module 206, the processor 202, and/or the like, or a combination thereof, configured to identify a group-based communication channel metadata set for one or more group-based communication channels. In at least some embodiments, for example, the apparatus 200 is configured to identify a group-based communication channel metadata set for each group-based communication channel in a manageable group-based communication channel set permissioned for management by an authenticated user account associated with the authenticated user account identifier. In some such embodiments, the manageable group-based communication channel set may be identified using the authenticated user account identifier received and/or identified at an earlier block, for example at block 902.

The apparatus 200 may identify permission data associated with the authenticated user account identifier and utilize such permission data to identify the manageable group-based communication channel set. For example, in a circumstance where the apparatus 200 queries for permission data associated with the authenticated user account identifier and retrieves permission data indicating the authenticated user account is an administrator user account for an organization, the apparatus 200 may identify all group-based communication channels as a sub-entity of the organization and include the group-based communication channels in the manageable group-based communication channel set. Additionally or alternatively, in a circumstance where the apparatus 200 retrieves permission data indicating the authenticated user account is an administrator user account for a workspace, the apparatus 200 may identify all group-based communication channels as a sub-entity of the workspace and include the group-based communication channels in the manageable group-based communication channel set. Additionally or alternatively, in a circumstance where the apparatus 200 retrieves permission data indicating the authenticated user account is an administrator user account, and/or otherwise is associated with data designating the authenticated user account identifier as an administrator user account, for the group-based communication channel, the apparatus 200 may include the group-based communication channel in the manageable group-based communication channel set. In this regard, the manageable group-based communication channel set may represent a personalized set of group-based communication channels manageable by the authenticated user account identifier based on assigned permission data.

At optional block 906, the apparatus 200 includes means, such as the central channel management module 212, the group-based communication module 210, the communications module 208, the input/output module 206, the processor 202, and/or the like, or a combination thereof, configured to transmit, to the client device, the group-based communication metadata set. In some embodiments, the group-based communication metadata set includes, or otherwise embodies, a set of channel information for each of the manageable group-based communication channels. In this regard, the group-based communication metadata set may be processed and/or analyzed to identify one or more group-based communication channels for managing via one or more channel management actions. In some embodiments, the apparatus 200 is configured to cause rendering of a centralized channel management dashboard by transmitting the group-based communication channel metadata set to the client device. The centralized channel management dashboard may be specially configured for displaying the group-based communication channel metadata set in a desired and/or efficient layout that enables improved processing and/or analysis of the metadata set, for example to identify one or more group-based communication channels requiring management. Additionally or alternatively, in some embodiments, for example as described herein, the centralized channel management dashboard includes one or more interface elements for filtering and/or otherwise limiting data rendered within the dashboard, and/or for initiating one or more channel management actions.

At optional block 908, the apparatus 200 includes means, such as the central channel management module 212, the group-based communication module 210, the communications module 208, the input/output module 206, the processor 202, and/or the like, or a combination thereof, configured to receive, from the client device, channel management data associated with a selected group-based communication channel of the manageable group-based communication channel set. The channel management data may embody one or more requests to alter one or more parameter values associated with the selected group-based communication channel. For example, in at least one example context, the channel management data embodies a set of authenticated user account identifiers to be permissioned for managing accessing the selected group-based communication channel, such that the identified authenticated user accounts may grant or revoke permission data to other authenticated user accounts for accessing the selected group-based communication channel. Alternatively or additionally, in another example context, the channel management data embodies a set of organization identifiers (and/or workspace identifiers) for which the selected group-based communication channel is to be shared.

In at least some embodiments, the channel management data is received in response to user interaction with the centralized channel management dashboard. For example, in some embodiments, the channel management data is received in response to user interaction with one or more channel management interface element(s) rendered via the dashboard. In this regard, it should be appreciated that the channel management interface element may be specially configured to transmit channel management data associated with a particular selected group-based communication channel of the manageable group-based communication channel set in response to user interaction.

It should be appreciated that the channel management data may represent a request for altering parameter values for a plurality of selected group-based communication channels. For example, a user may request that all manageable group-based communication channels of a certain channel type (e.g., all public common group-based communication channels) have access managed by a particular set of authenticated user accounts identified by the channel management data. In this regard, the channel management data may be associated with a plurality of selected group-based communication channels of the manageable group-based communication channel set. In some such embodiments, the channel management data includes a set of channel identifiers for the set of selected group-based communication channels to be managed.

At optional block 910, the apparatus 200 includes means, such as the central channel management module 212, the group-based communication module 210, the communications module 208, the input/output module 206, the processor 202, and/or the like, or a combination thereof, configured to process the channel management data to update the selected group-based communication channel. In this regard, the apparatus 200 may be configured to store an updated value represented by the channel management data for one or more parameter values, and/or other stored information, associated with the selected group-based communication channel. For example, in an example context where the set of authenticated user accounts permissioned for managing access to the selected group-based communication channel is updated, the apparatus 200 may delete permission data associated with authenticated user account identifiers no longer identified in the channel management data, and store permission data associated with authenticated user account identifiers newly identified in the channel management data. In other embodiments, for example in a circumstance where the channel management data is associated with a plurality of selected group-based communication channels, the apparatus 200 may be configured to process the channel management data to update the plurality of selected group-based communication channels.

In some embodiments, upon updating the selected group-based communication channel(s), the apparatus 200 may generate and/or transmit one or more response transmissions to the client device indicating successful processing of the channel management data. Alternatively or additionally, in at least some embodiments, the response transmission(s) are configured to cause updating of data rendered via a centralized channel management dashboard. In this regard, in such contexts, the apparatus 200 may be configured to enable real-time management and processing of channel information associated with any number of group-based communication channels.

In some embodiments, the apparatus 200 generates a new group-based communication message posted within the selected group-based communicating channel(s) upon successfully managing the selected group-based communication channel(s). In some such embodiments, the generated new group-based communication message provides predefined summary information regarding one or more management actions performed for the channel. For example, in a circumstance where a channel rename action is successfully processed, the apparatus 200 may generate a group-based communication message for the selected group-based communication channel that indicates an administrator has renamed the selected group-based communication channel(s) (e.g., includes the message contents "An administrator has renamed this channel."). In this regard, the new group-based communication messages may provide notification information to users accessing the selected group-based communication channel(s). For example, the new group-based communication message may be rendered to a group-based communication interface in a circumstance where a use accesses any of the selected group-based communication channel(s), via an authenticated user account, from within the group-based communication interface.

At optional decision block 912, the apparatus 200 includes means, such as the central channel management module 212, the group-based communication module 210, the communications module 208, the input/output module 206, the processor 202, and/or the like, or a combination thereof, configured to determine whether new channel management data was received. In this regard, the apparatus 200 may be configured to receive any number of channel management data during one or more authenticated sessions. For example, a user may submit one or more requests via an API maintained by the apparatus 200, and thus the apparatus 200 may receive new channel management data in response to one or more new API requests. Alternatively or additionally, in some embodiments, new channel management data is received in response to subsequent user interaction with a rendered centralized channel management dashboard. For example, a user may initiate various requests for configuring group-based communication channels of different channel types. In some such embodiments in a circumstance where the apparatus determines new channel management data is received, flow returns to 908 and the new channel management data may be processed by the apparatus 200. In a circumstance where the apparatus 200 determines new channel management data was not received, the flow may end.

FIG. 10 illustrates example additional operations for an example process for centralized channel management, specifically to identify a group-based communication metadata set for one or more group-based communication channel, in accordance with at least some example embodiments of the present disclosure. In some embodiments, one or more of the blocks of FIG. 10 is additional to, and/or replaces, one or more blocks of another process. For example, as illustrated, in some embodiments, the process begins after one or more blocks of FIG. 9, for example after optional block 902. Additionally or alternatively, in some embodiments, flow returns to one or more other processes described herein after completion of the process as depicted and described with respect to FIG. 10. For example, as illustrated, in some embodiments, the process returns to block 906 as depicted and described with respect to FIG. 9 after completion of block 1004 as depicted and described with respect to FIG. 10.

At block 1002, the apparatus 200 includes means, such as the central channel management module 212, the group-based communication module 210, the communications module 208, the input/output module 206, the processor 202, and/or the like, or a combination thereof, configured to identify a group-based communication identifier set associated with the manageable group-based communication channel set. In this regard, the apparatus 200 may be configured to identify the manageable group-based communication channel set based on at least the authenticated user account identifier. In this regard, the apparatus 200 may query for the group-based communication channel identifier for each identified manageable group-based communication channel. It should be appreciated that, in some embodiments, the manageable group-based communication channel set embodies the group-based communication channel identifier set for the manageable group-based communication channels associated with the authenticated user account identifier.

At block 1004, the apparatus 200 includes means, such as the central channel management module 212, the group-based communication module 210, the communications module 208, the input/output module 206, the processor 202, and/or the like, or a combination thereof, configured to query a channel datastore based on the group-based communication channel set to receive each group-based communication channel metadata set for each group-based communication channel identifier in the group-based communication channel identifier set. In some such embodiments, the apparatus 200 receives a set of group-based communication metadata sets, representing each group-based communication channel metadata set associated with each group-based communication channel identifier in the group-based communication channel identifier set, from the channel datastore in response to the query. It should be appreciated that the group-based communication channel metadata set may include various channel information. For example, each group-based communication metadata set may include one or more parameter values of the group-based communication channel (e.g., a channel name, channel type, shared status, or the like) or information derived and/or otherwise associated with the group-based communication channel (e.g., authenticated user accounts permissioned to access the channel as a member, third-party organization identifiers and/or other information with which the channel is shared). In various embodiments, the apparatus 200 may be configured to receive any type of channel information, and/or information derived therefrom and/or otherwise associated with such channel information, for processing and/or analysis by a user, or otherwise useful in one or more decision-making processes for determining whether to manage the group-based communication channel.

FIG. 11 further illustrates example additional operations for an example process for centralized channel management, specifically to identify a group-based communication metadata set for one or more group-based communication channel, in accordance with at least some example embodiments of the present disclosure. In some embodiments, one or more of the blocks of FIG. 11 is additional to, and/or replaces, one or more blocks of another process. For example, as illustrated, in some embodiments, the process begins after one or more blocks of FIG. 9, for example after optional block 902. Additionally or alternatively, in some embodiments, flow returns to one or more other processes described herein after completion of the process as depicted and described with respect to FIG. 11. For example, as illustrated, in some embodiments, the process returns to block 906 as depicted and described with respect to FIG. 9 after completion of block 1104 as depicted and described with respect to FIG. 11.

At block 1102, the apparatus 200 includes means, such as the central channel management module 212, the group-based communication module 210, the communications module 208, the input/output module 206, the processor 202, and/or the like, or a combination thereof, configured to determine the authenticated user account identifier is associated with workspace permission data linked to a workspace identifier. In this regard, the workspace permission data may embody specific permission data indicating the authenticated user account embodies an administrator user account with respect to the workspace and/or otherwise is designated for managing the workspace identified by the workspace identifier and/or sub-entities thereof. In some embodiments, to determine the authenticated user account identifier is associated with workspace permission data linked to the workspace identifier, the apparatus 200 is configured to query one or more datastores. For example, in at least some embodiments, the apparatus 200 may query one or more datastores based on the authenticated user account identifier and receive at least the workspace permission data linked to the workspace identifier in response to the query.

At block 1104, the apparatus 200 includes means, such as the central channel management module 212, the group-based communication module 210, the communications module 208, the input/output module 206, the processor 202, and/or the like, or a combination thereof, configured to identify each group-based communication channel metadata set for at least one group-based communication channel associated with the workspace identifier. In this regard, for example, the apparatus 200 may be configured to identify a group-based communication channel set embodying sub-entities of the workspace identified by the workspace identifier. Such group-based communication channels may be "within" the workspace, such that the workspace permission data indicates the authenticated user account is permissioned for managing such sub-entities associated with the workspace identifier as well. In some such embodiments, the apparatus 200 may be configured to identify the at least one group-based communication channel associated with the workspace identifier by querying at least one datastores for group-based communication channels associated with the workspace identifier, and receiving the at least one group-based communication channel in response to the query. In some such circumstances, the group-based communication channel metadata set for each group-based communication channel may subsequently be parsed from the retrieved at least one group-based communication channel, and/or retrieved based on information retrieved for the at least one group-based communication channel. For example, in some embodiments where the query for the at least one group-based communication channel associated with the workspace identifier retrieves only channel identifiers for such group-based communication channels, the apparatus 200 may be configured to perform one or more additional queries to retrieve the group-based communication metadata set for each group-based communication identifier.

FIG. 12 further illustrates example additional operations for an example process for centralized channel management, specifically to identify a group-based communication metadata set for one or more group-based communication channel, in accordance with at least some example embodiments of the present disclosure. In some embodiments, one or more of the blocks of FIG. 12 is additional to, and/or replaces, one or more blocks of another process. For example, as illustrated, in some embodiments, the process begins after one or more blocks of FIG. 9, for example after optional block 902. Additionally or alternatively, in some embodiments, flow returns to one or more other processes described herein after completion of the process as depicted and described with respect to FIG. 12. For example, as illustrated, in some embodiments, the process returns to block 906 as depicted and described with respect to FIG. 9 after completion of block 1204 as depicted and described with respect to FIG. 12.

In this regard, the apparatus 200 may be configured to determination a particular authenticated user account is permissioned for managing an organization. Additionally or alternatively, based at least on this determination, the apparatus 200 may be configured to identify all workspaces associated with, owned by, and/or otherwise accessible to the organization. Such entities may be identified to provide such information to a client device associated with the authenticated user account, and/or to provide functionality for managing such entities. For example, in some such embodiments, the apparatus 200 is configured to identify a set of workspaces, and a set of channel identifiers for each manageable channel within the workspace. Additionally or alternatively still, the apparatus 200 may retrieve channel information for each channel, for example to provide such information to a client device associated with the authenticated user account, and/or to provide functionality for managing such group-based communication channels. In this regard, the apparatus 200 may provide one or more APIs for identifying such information associated with one or more entities, and/or for performing one or more associated actions for managing such entities. It should be appreciated that the API may be accessible through one or more interfaces as described herein, and/or in at least some embodiments may be accessed directly through one or more corresponding request(s) as described herein.

At block 1202, the apparatus 200 includes means, such as the central channel management module 212, the group-based communication module 210, the communications module 208, the input/output module 206, the processor 202, and/or the like, or a combination thereof, configured to determine the authenticated user account identifier is associated with organization permission data linked to an organization identifier. The organization permission data may be associated with one or more entity types, for example group-based communication channel types, such that the authenticated user account is permissioned for managing all group-based communication channels associated with the permissioned channel type in any workspace associated with the organization. In this regard, the organization permission data may embody specific permission data indicating an authenticated user account embodies an administrator user account with respect to the organization identified by the organization identifier, and/or otherwise is designated for managing the organization identified by the organization identifier and/or sub-entities thereof. In some embodiments, to determine the authenticated user account identifier is associated with organization permission data linked to the organization identifier, the apparatus 200 is configured to query one or more datastores. For example, in at least some embodiments, the apparatus 200 may query one or more datastores based on the authenticated user account identifier and receive at least the organization permission data linked to the organization identifier in response to the query (or queries). In some such embodiments, the apparatus 200 is configured to query one or more user datastores including such permission data associated with the authenticated user account identifier and organization identifier, and/or one or more permission data datastores including such permission data associated with the authenticated user account identifier and organization identifier.

At block 1202, the apparatus 200 includes means, such as the central channel management module 212, the group-based communication module 210, the communications module 208, the input/output module 206, the processor 202, and/or the like, or a combination thereof, configured to identify each group-based communication metadata set for at least one group-based communication channel associated with the organization identifier. In this regard, the apparatus 200 may be configured to identify a group-based communication channel set embodying sub-entities of the organization identified by the organization identifier. Such group-based communication channels may be "within" the organization, and/or within one or more workspaces associated with the organization, such that the organization permission data indicates the authenticated user account is permissioned for managing such group-based communication channels as sub-entities of the organization. In some such embodiments, the apparatus 200 may be configured to identify group-based communication channel(s) associated with the organization identifier by querying at least one datastores based on the organization identifier, and receiving the group-based communication channel set in response to the query. Alternatively or additionally, the apparatus 200 may identify a set of workspace identifiers associated with the organization identifier (e.g., for workspaces that are sub-entities of the organization identifier), and further query for the group-based communication channel set based on the set of workspace identifiers. In some such circumstances, the group-based communication channel metadata set for each group-based communication channel may subsequently be parsed from the retrieved group-based communication channel(s), and/or retrieved based on the information retrieved for each group-based communication channel. For example, in some embodiments where the query for the at least one group-based communication channel associated with the organization retrieves only channel identifiers for such group-based communication channels, the apparatus 200 may be configured to perform one or more additional queries to retrieve the group-based metadata set for each group-based communication identifier.

FIG. 13 further illustrates example additional operations for an example process for centralized channel management, specifically to identify a group-based communication metadata set for one or more group-based communication channel, in accordance with at least some example embodiments of the present disclosure. In some embodiments, one or more of the blocks of FIG. 13 is additional to, and/or replaces, one or more blocks of another process. For example, as illustrated, in some embodiments, the process begins after one or more blocks of FIG. 9, for example after optional block 902. Additionally or alternatively, in some embodiments, flow returns to one or more other processes described herein after completion of the process as depicted and described with respect to FIG. 13. For example, as illustrated, in some embodiments, the process returns to block 906 as depicted and described with respect to FIG. 9 after completion of block 1304 as depicted and described with respect to FIG. 13.

At block 1302, the apparatus 200 includes means, such as the central channel management module 212, the group-based communication module 210, the communications module 208, the input/output module 206, the processor 202, and/or the like, or a combination thereof, configured to determine the authenticated user account identifier is associated with channel owner data or delegated management data for a private group-based communication channel. In some embodiments, for example, the apparatus 200 is configured to store channel owner data for each group-based communication channel, and is configured to identify the group-based communication channels where such channel owner data represents the authenticated user account identifier. Alternatively or additionally, in at least some embodiments, the apparatus 200 is configured to store, for each group-based communication channel, delegated management data associated with the group-based communication channel that indicates the user has been granted permissions for managing one or more settings of the group-based communication channel associated with the delegated management data. In some such embodiments, the apparatus 200 is configured to query one or more datastores for channel owner data and/or delegated management data representing the authenticated user account identifier, and determine the group-based communication channel(s) associated with such data based on information received in response to the query or queries.

It should be appreciated that, in some embodiments, an authenticated user account associated with channel owner data and/or delegated management data for a particular group-based communication channel may be determined for any of a number of channel types. For example as illustrated, the apparatus 200 may determine the channel owner data and/or delegated management data is associated with a private group-based communication channel. In some such embodiments, the private group-based communication channel may be configured such that only authenticated user account identifiers represented by the channel owner data and/or delegated management data for the private group-based communication channel, and/or a higher-level entity, are permissioned to manage the private group-based communication channel. In this regard, in some embodiments, the authenticated user account identifier need not be permissioned to access the private group-based communication channel or even an associated workspace. Instead, the authenticated user account may be associated with permission data for managing the private group-based communication channel and/or a higher level entity regardless of whether the authenticated user account is also permissioned for accessing the private group-based communication channel. In circumstances where private group-based communication channels require additional configuration to access the private group-based communication channel, (e.g., an invitation to the private group-based communication channel is sent from an administrator of the private group-based communication channel to the authenticated user account, then accepted by the authenticated user account), processing resources associated with such an invitation process are conserved by enabling direct management of the private group-based communication channel without such access to the channel.

At block 1304, the apparatus 200 includes means, such as the central channel management module 212, the group-based communication module 210, the communications module 208, the input/output module 206, the processor 202, and/or the like, or a combination thereof, configured to identify at least a group-based communication metadata set for the private group-based communication channel. In some embodiments, the group-based communication metadata set is retrieved from one or more datastores configured for storing data embodying and/or associated with each group-based communication channel. In some embodiments, for example, a channel identifier for the private group-based communication channel may be identified at one or more earlier steps, for example at block 1302. In some such embodiments, the apparatus 200 may be configured to identify the group-based communication metadata set for the private group-based communication channel by querying one or more datastores based on the determined group-based communication channel identifier.

FIG. 14 further illustrates example additional operations for an example process for centralized channel management, specifically to provide channel privacy access data associated with a selected group-based communication channel, in accordance with at least some example embodiments of the present disclosure. In some embodiments, one or more of the blocks of FIG. 14 is additional to, and/or replaces, one or more blocks of another process. For example, as illustrated, in some embodiments, the process begins after one or more blocks of FIG. 9, for example after optional block 902. Additionally or alternatively, in some embodiments, flow returns to one or more other processes described herein after completion of the process as depicted and described with respect to FIG. 14. For example, as illustrated, in some embodiments, the process returns to block 906 as depicted and described with respect to FIG. 9 after completion of block 1304 as depicted and described with respect to FIG. 14.

At block 1402, the apparatus 200 includes means, such as the central channel management module 212, the group-based communication module 210, the communications module 208, the input/output module 206, the processor 202, and/or the like, or a combination thereof, configured to receive, from a second client device associated with a second authenticated user account, a selected channel information request for a selected communication channel. In some embodiments, the selected channel information request represents a request to for information regarding entities having access to data posted to and/or otherwise transmitted within a selected group-based communication channel. For example, the selected group-based communication channel may represent a group-based communication channel that the second authenticated user account is accessing, or otherwise permissioned to access. In some embodiments, the selected channel information request includes at least a channel identifier for the selected group-based communication channel.

In some embodiments, the apparatus 200 is configured to receive the selected channel information request from the second client device in response to one or more user interactions via the second client device. For example, in some embodiments, the selected channel information request is received via one or more APIs made available via the apparatus 200. Additionally or alternatively, in some embodiments, the selected channel information request is received from the client device in response to user interaction with one or more elements of an interface rendered via the second client device. For example, in some embodiments, the selected channel information request is received in response to user interaction with a group-based communication channel, for example to select the select group-based communication channel, to request information associated with the selected group-based communication channel after selection, automatically when rendering one or more sub-interfaces associated with the selected group-based communication channel (e.g., a sharing interface or other channel management interface, such as the interface 800 as depicted and described above with respect to FIG. 8), and/or in response to one or more user interactions with interface elements specifically configured for requesting information for one or more selected group-based communication channels. In some embodiments, the selected channel information request is transmitted from within a centralized channel management dashboard.

At block 1404, the apparatus 200 includes means, such as the central channel management module 212, the group-based communication module 210, the communications module 208, the input/output module 206, the processor 202, and/or the like, or a combination thereof, configured to identify, based on group-based communication metadata set associated with the selected group-based communication channel, channel privacy access data associated with the selected group-based communication channel. In this regard, the channel privacy access data may indicate one or more sets of authenticated user accounts having access to the group-based communication channel. Such sets of authenticated user accounts may, in some embodiments, be defined by authenticated user accounts associated with one or more organizations and/or workspaces with which the channel is shared. For example, if the group-based communication channel is publicly shared with the organization "ACME," the channel privacy access data may identify the ACME organization and/or otherwise include data indicating ACME has access to the group-based communication channel. In this regard, the channel privacy access data may embody data derived from some or all of the group-based communication channel metadata set for the selected group-based communication channel. For example, the identified group-based communication channel metadata set may include the organization identifiers and/or workspace identifiers with which the selected group-based communication channel is shared, and/or one or more authenticated user account identifiers with which the selected group-based communication channel is shared. In this regard, the channel privacy access data derived therefrom may embody the identifiers for the organization(s), workspace(s), and/or authenticated user account(s), and/or may represent other data, for example name data for each organization, workspace, and/or authenticated user, permissioned to access the selected group-based communication channel.

At block 1406, the apparatus 200 includes means, such as the central channel management module 212, the group-based communication module 210, the communications module 208, the input/output module 206, the processor 202, and/or the like, or a combination thereof, configured to transmit, to the second client device, the channel privacy access data for processing. In some embodiments, the apparatus 200 is configured to transmit the channel privacy access data to cause the client device to initiate one or more actions based on the channel privacy access data. For example, in one example context, the client device may further process the channel privacy access data to determine whether permission data should be revoked for one or more organization(s), workspace(s), and/or authenticated user account(s), and to cause the second client device to initiate one or more transmissions for revoking such permission data. Alternatively or additionally in one example context, the client device may further process the channel privacy access data to determine whether permission data should be granted for one or more organization(s), workspace(s), and/or authenticated user account(s) for accessing the selected group-based communication channel (e.g. where the permission data represents access to the selected group-based communication channel and/or sharing of the group-based communication channel with one or more organization(s) and/or workspace(s)), and/or to cause the second client device initiate one or more transmissions for granting such permission data. It should be appreciated that, in some embodiments, the apparatus 200 causes initiation of such transmissions through the second client device in circumstances where the client device is associated with an authenticated user account permissioned for managing access to the selected group-based communication channel.

Alternatively or additionally, in some embodiments, the channel privacy access data is configured to be rendered to one or more interfaces rendered via the second client device. For example, in some embodiments, the apparatus 200 transmits the channel privacy access data to cause rendering of channel privacy notification information based at least on the channel privacy access data. In some embodiments, for example, the apparatus 200 may be configured to cause rendering of name information derived based on the identified channel privacy access data, for example where the name information indicates entities and/or users permissioned for accessing the selected group-based communication channel. It should be appreciated that, in some embodiments, the channel privacy notification information is embodied by the channel privacy access data. In some embodiments, the channel privacy notification information enables a user to determine whether to revoke existing access for one or more organizations, workspaces, and/or authenticated user accounts (for example by generating and/or storing permission data), and/or granting new access to one or more organizations, workspaces, and/or authenticated user accounts (for example by deleting stored permission data).

Example Client Device Operations for Centralized Channel Management

FIG. 15 illustrates a flowchart depicting various example operations for processes and/or sub-processes for centralized channel management, in accordance with at least some example embodiments of the present disclosure. In at least some embodiments the described processes are performed via a specially configured client device, for example embodied by the apparatus 300 as depicted and described with respect to FIG. 3. In some embodiments, the apparatus 300 is in communication with one or more additional systems, devices, apparatuses, and/or the like, to enable one or more of the operations described herein. For example, in some embodiments, the apparatus 300 is in communication with at least a group-based communication system, where the group-based communication system may be embodied by the specially configured apparatus 200 as depicted and described above with respect to FIG. 2. It should be appreciated that the apparatus 300 may be configured to communicate with the group-based communication system over one or more communication networks, such as the Internet. In some embodiments, one or more of the operation(s) are performed associated with one or more interfaces, for example a centralized channel management dashboard. Additionally or alternatively, in some embodiments, one or more operation(s) are performed via one or more APIs made available via the apparatus 300 and/or a corresponding group-based communication system, for example embodied by the apparatus 200.

As illustrated in the various flowcharts, optional blocks are depicted with dashed (or "broken") lines. It should be appreciated that, in at least some embodiments, one or more of the optional blocks is performed. Additionally or alternatively, in at least one embodiment, none of the optional blocks is performed. Additionally or alternatively still, in yet at least one other embodiment, all of the optional blocks are performed. It should also be appreciated that, in some embodiments, one or more blocks (whether indicated as optional or not) may be dropped from the embodiment processes as depicted and described. In this regard, one or more sub-combinations of blocks may represent a process and/or subprocess performed by one or more embodiments intended to be covered by the disclosure provided herein.

FIG. 15 depicts example operations for an example process for centralized channel management, in accordance with at least some example embodiments of the present disclosure. At optional block 1502, the apparatus 300 includes means, such as the group-based client module 310, communications module 308, input/output module 306, processor 302 and/or the like, or a combination thereof, configured to transmit a centralized channel management request to a group-based communication system. In some embodiments, the centralized channel management request is associated with an authenticated user account identifier corresponding to an authenticated user account associated with an authenticated session. In at least some embodiments, the centralized channel management request is transmitted automatically upon initiating an authenticated session, and/or is otherwise embodied by the request to initiate the authenticated session, and receive centralized channel data from the group-based communication system. Additionally or alternatively, in at least some embodiments, the apparatus 300 may generate and/or transmit the centralized channel management request to the group-based communication system in response to a user-initiated action (e.g., launching a particular webpage, native app functionality, or the like). In some embodiments, for example, the user may interact with an interface element of a group-based communication interface for accessing a centralized channel management dashboard, causing the apparatus 300 to generate and/or transmit the centralized channel management request automatically. Alternatively or additionally, in at least some embodiments, the apparatus 300 is configured to transmit the centralized channel management request via one or more APIs associated with the group-based communication system.

At block 1504, the apparatus 300 includes means, such as the group-based client module 310, communications module 308, input/output module 306, processor 302 and/or the like, or a combination thereof, configured to receive centralized channel data from a group-based communication system. In at least some embodiments, the centralized channel data includes at least a group-based communication channel metadata set for each group-based communication channel in a manageable group-based communication channel set for an authenticated user account. In this regard, the authenticated user account may be associated with the client device for example during an authenticated session. It should be appreciated that the manageable group-based communication channel set for the authenticated user account may be identified by the group-based communication system, for example using one or more queries based on the authenticated user account and/or a corresponding authenticated user account identifier. In some embodiments, the centralized channel data is received in response to a centralized channel management request, for example transmitted at an earlier step, for example block 1502.

At block 1506, the apparatus 300 includes means, such as the group-based client module 310, communications module 308, input/output module 306, processor 302 and/or the like, or a combination thereof, configured to process the group-based communication channel metadata set. In some embodiments, the group-based communication channel metadata set may be processed for performing one or more determinations, such as whether to revoke permission data for accessing one of the manageable group-based communication channels to one or more organizations, workspaces, authenticated user accounts, and/or the like, and/or whether to grant permission data for accessing one of the manageable group-based communication channels to one or more organizations, workspaces, authenticated user accounts, and/or the like. Alternatively or additionally, the apparatus 300 may process the group-based communication channel metadata set for purposes of rendering one or more interfaces, for example as described herein with respect to block 1508.

At optional block 1508, the apparatus 300 includes means, such as the group-based client module 310, communications module 308, input/output module 306, processor 302 and/or the like, or a combination thereof, configured to cause rendering of a centralized channel management dashboard based on at least the centralized channel data. In at least some embodiments, the centralized channel management dashboard includes the group-based communication channel metadata set, and/or at least a portion thereof. In this regard, as described herein, the centralized channel management dashboard may be rendered based at least on the centralized channel data. Additionally or alternatively, in some embodiments, the centralized channel management dashboard further includes information derived based on data from the group-based communication channel metadata set and/or other information of the centralized channel data. In some such embodiments, the centralized channel management dashboard may be processed and/or analyzed to enable a system and/or user to perform one or more determinations regarding management of a manageable group-based communication channel. In some embodiments, as described herein, in some embodiments the centralized channel management dashboard further includes one or more interface elements for searching for data within the centralized channel management dashboard, filtering data rendered to the centralized channel management dashboard, and/or the like.

Additionally or alternatively still, in at least some embodiments, the channel management dashboard includes one or more interface elements configured to enable initiation of one or more management actions via the group-based communication system. For example, in at least some such embodiments, the centralized channel management dashboard further includes at least one channel management action interface element associated with at least one group-based communication channel of the manageable group-based communication channel set. Alternative or additionally in some embodiments, a channel management action interface element is associated with a plurality of group-based communication channels of the manageable group-based communication channel set. In yet some other embodiments, the centralized channel management dashboard includes a plurality of channel management action interface elements associated with each manageable group-based communication channel, or a plurality of manageable group-based communication channels. For example, a first channel management action interface element may be configured to initiate a channel sharing action, a second channel management interface element may be configured to initiate an action for granting and/or revoking permission data for managing the group-based communication channel, and/or the like.

At optional block 1510, the apparatus 300 includes means, such as the group-based client module 310, communications module 308, input/output module 306, processor 302 and/or the like, or a combination thereof, configured to transmit a centralized channel management request to a group-based communication system. In some embodiments, the centralized channel management request is associated with an authenticated user account identifier corresponding to the authenticated user account. In this regard, the authenticated user account identifier may be used to validate that the user is properly permissioned for managing one or more group-based communication channel(s) identified by data in and/or associated with the centralized channel management request. For example, in some embodiments, the centralized channel management request includes one or more group-based communication channel identifiers for the channel(s) to be managed. The channel identifiers may be automatically determined, for example by the apparatus 200, in response to one or more user interactions (e.g., with rendered channel management interface element(s)) and/or based at least on one or more determinations (e.g., identifying channel(s) to be managed).

The centralized management request may represent any number of possible actions for managing one or more group-based communication channels. For example, in some embodiments, the channel management request may represent a user request to initiate a channel archive action (e.g., for archiving group-based communication messages of at least one group-based communication channel), a channel rename action (e.g., to update name data associated with at least one group-based communication channel), a channel share action (e.g., to share and/or revoke sharing of at least one group-based communication channel), and/or a channel delete action (e.g., to mark for deletion, and/or permanently delete, and/or otherwise make accessible at least one group-based communication channel). It should be appreciated that, in some embodiments, a centralized channel management request may be configured to include specific data indicating the request is associated with a particular action to be performed. In one such example context, a transmission may include, or otherwise be configured based on, an action identifier that uniquely identifies the management action to be performed for the one or more group-based communication channels.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., a FPGA or an ASIC. The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, implemented by one or more computing devices of a group-based communication system, comprising:
    receiving, via a first user interface of the group-based communication system presented via a client device of a user associated with a first organization, a first request to generate a communication channel that is to include one or more first users of the first organization and one or more second users of a second organization that is different than the first organization;
    generating, based at least in part on the first request, the communication channel, wherein members of the communication channel include the one or more first users and the one or more second users;
    determining, based at least in part on input from the user, one or more settings that indicate at least one of users that are authorized to access the communication channel or actions that the members are authorized to perform in association with the communication channel;
    receiving, from the user and via the first user interface or a second user interface of the group-based communication system, a second request for a modification to the communication channel; and
    updating, based at least in part on the second request, data associated with the communication channel.

2. The method as recited in claim 1, wherein the first user interface or the second user interface is a channel management interface that facilitates generation and modification of communication channels associated with the first organization and other organizations, including the second organization, that are external to the first organization.

3. The method as recited in claim 1, wherein updating the data comprises implementing the modification with respect to the communication channel.

4. The method as recited in claim 1, wherein the one or more settings apply to each of the members of the communication channel.

5. The method as recited in claim 1, wherein the one or more settings apply to a subset of the members of the communication channel that is less than an entirety of the members of the communication channel.

6. The method as recited in claim 1, wherein the one or more settings indicate whether the members are authorized to create communication channels within the group-based communication system, wherein the communication channels include at least one of private communication channels that are accessible to a limited set of users of the group-based communication system, public communication channels that are accessible to users in addition to the limited set of users, or shared communication channels that are accessible to users from different organizations.

7. The method as recited in claim 1, wherein the one or more settings indicate whether the members of the communication channel are authorized to invite additional users to join the communication channel.

8. The method as recited in claim 1, wherein the one or more settings indicate whether the members of the communication channel are authorized to join a second communication channel that includes users of different organizations.

9. The method as recited in claim 1, wherein determining the one or more settings comprises receiving, from the user and via the first user interface, a selection of one or more selectable controls associated with the one or more settings.

10. The method as recited in claim 1, wherein receiving the second request comprises receiving, from the user and via the first user interface, a selection of one or more selectable controls associated with the modification, wherein the modification corresponds to one or more changes to the one or more settings.

11. A system comprising:
one or more processors;
memory; and
one or more computer-executable instructions stored in the memory and executable by the one or more processors to perform operations comprising:
receiving, via a first user interface of a group-based communication system presented via a client device of a user associated with a first organization, a first request to generate a communication channel that is to include one or more first users of the first organization and one or more second users of a second organization that is different than the first organization;
generating, based at least in part on the first request, the communication channel, wherein members of the communication channel include the one or more first users and the one or more second users;
determining, based at least in part on input from the user, one or more settings that indicate at least one of users that are authorized to access the communication channel or actions that the members are authorized to perform in association with the communication channel;
receiving, from the user and via the first user interface or a second user interface of the group-based communication system, a second request for a modification to the communication channel; and
updating, based at least in part on the second request, data associated with the communication channel.

12. The system as recited in claim 11, wherein the first user interface or the second user interface is a channel management interface that facilitates generation and modification of communication channels associated with the first organization and other organizations, including the second organization, that are external to the first organization.

13. The system as recited in claim 11, wherein updating the data comprises implementing the modification with respect to the communication channel.

14. The system as recited in claim 11, wherein the one or more settings apply to each of the members of the communication channel.

15. The system as recited in claim 11, wherein the one or more settings apply to a subset of the members of the communication channel that is less than an entirety of the members of the communication channel.

16. One or more non-transitory computer-readable media storing one or more computer-executable instructions that, when executed by one or more processors, cause the one or more processors to perform operations comprising:
receiving, via a first user interface of a group-based communication system presented via a client device of a user associated with a first organization, a first request to generate a communication channel that is to include one or more first users of the first organization and one or more second users of a second organization that is different than the first organization;
generating, based at least in part on the first request, the communication channel, wherein members of the communication channel include the one or more first users and the one or more second users;
determining, based at least in part on input from the user, one or more settings that indicate at least one of users that are authorized to access the communication channel or actions that the members are authorized to perform in association with the communication channel;
receiving, from the user and via the first user interface or a second user interface of the group-based communication system, a second request for a modification to the communication channel; and
updating, based at least in part on the second request, data associated with the communication channel.

17. The one or more non-transitory computer-readable media as recited in claim 16, wherein the one or more settings indicate whether the members are authorized to create communication channels within the group-based communication system, wherein the communication channels include at least one of private communication channels that are accessible to a limited set of users of the group-based communication system, public communication channels that are accessible to users in addition to the limited set of users, or shared communication channels that are accessible to users from different organizations.

18. The one or more non-transitory computer-readable media as recited in claim 16, wherein the one or more settings indicate whether the members of the communication channel are authorized to invite additional users to join the communication channel.

19. The one or more non-transitory computer-readable media as recited in claim 16, wherein the one or more settings indicate whether the members of the communication channel are authorized to join a second communication channel that includes users of different organizations.

20. The one or more non-transitory computer-readable media as recited in claim 16, wherein determining the one or more settings comprises receiving, from the user and via the first user interface, a selection of one or more selectable controls associated with the one or more settings.

* * * * *